(12) United States Patent
Nakamura et al.

(10) Patent No.: US 12,267,031 B2
(45) Date of Patent: Apr. 1, 2025

(54) SUPERCONDUCTING ROTATING MACHINE AND METHOD OF CONTROLLING SUPERCONDUCTING ROTATING MACHINE

(71) Applicant: KYOTO UNIVERSITY, Kyoto (JP)

(72) Inventors: Taketsune Nakamura, Kyoto (JP); Alexandre Colle, Kyoto (JP); Kenjiro Matsuki, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 202 days.

(21) Appl. No.: 18/038,052

(22) PCT Filed: Nov. 22, 2021

(86) PCT No.: PCT/JP2021/042782
§ 371 (c)(1),
(2) Date: May 22, 2023

(87) PCT Pub. No.: WO2022/113930
PCT Pub. Date: Jun. 2, 2022

(65) Prior Publication Data
US 2023/0421083 A1    Dec. 28, 2023

(30) Foreign Application Priority Data
Nov. 25, 2020  (JP) .................................. 2020-195167

(51) Int. Cl.
*H02P 23/08* (2006.01)
*H02K 55/04* (2006.01)

(52) U.S. Cl.
CPC ............ *H02P 23/08* (2013.01); *H02K 55/04* (2013.01); *H02K 2213/03* (2013.01)

(58) Field of Classification Search
CPC ..... H02K 2213/03; H02K 55/04; H02P 23/08
See application file for complete search history.

(56) References Cited

U.S. PATENT DOCUMENTS 3,564,307 A * 2/1971 Kawabe ................. H02K 55/00
310/10
4,885,494 A * 12/1989 Higashi .................... H02K 9/19
310/201

(Continued)

FOREIGN PATENT DOCUMENTS

| JP | H08-034715 B2 | 7/1989 |
| JP | 2013-55733 | 3/2013 |
| WO | 2009/116219 | 9/2009 |

OTHER PUBLICATIONS

International Search Report, issued in International Patent Application No. PCT/JP2021/042782, mailed Feb. 15, 2022, along with an English translation thereof.

*Primary Examiner* — Thai T Dinh
(74) *Attorney, Agent, or Firm* — Greenblum & Bernstein, P.L.C.

(57) ABSTRACT

A superconducting rotating machine, including: a stator that has a tubular stator iron core and stator windings wound around the stator iron core and generates a rotating magnetic field; a superconducting rotor having: a superconducting squirrel-cage winding that is held rotatably with the rotating magnetic field of the stator on an inner peripheral side and has one or more rotor bars and end rings each made of a superconducting material; and a rotor iron core that has a plurality of slots to accommodate the rotor bars; a pulse voltage output unit that outputs a pulse voltage to shift the superconducting squirrel-cage winding to a magnetic flux flow state; a drive voltage output unit that applies a drive voltage to the stator windings to rotationally drive the superconducting rotor, wherein the pulse voltage output from the pulse voltage output unit is superimposed on the drive voltage.

10 Claims, 13 Drawing Sheets

(56) References Cited

U.S. PATENT DOCUMENTS

| | | | | |
|---|---|---|---|---|
| 5,325,002 | A * | 6/1994 | Rabinowitz | H02K 55/04 505/876 |
| 6,711,422 | B2 * | 3/2004 | Mawardi | H02K 55/04 505/120 |
| 8,248,657 | B2 * | 8/2012 | Kunihiro | G06K 15/1864 358/1.9 |
| 2011/0084566 | A1 | 4/2011 | Nakamura | |

* cited by examiner (A)

(B)

SUPERCONDUCTING ROTATING MACHINE AND METHOD OF CONTROLLING SUPERCONDUCTING ROTATING MACHINE

TECHNICAL FIELD

The present invention relates to a superconducting rotating machine and a method of controlling the superconducting rotating machine.

BACKGROUND ART

Rotating machines, which are electrical devices, are classified into DC machines and AC machines. Of them, AC machines receive mechanical power to generate AC power or receive AC power to generate mechanical power, and are mainly classified into induction machines and synchronous machines.

An induction machine, for example, an induction motor is rotated by induced torque generated in a rotor by a rotating magnetic field, which is generated by an applied polyphase AC voltage (in many cases, a three-phase AC voltage) to stator windings. Induction motors are widely used, since they have a simple structure, are easy to maintain, and are inexpensive. However, they have problems in terms of efficiency and speed control.

A synchronous machine, for example, a synchronous motor rotates when a rotor equipped with an electromagnet or a permanent magnet is attracted to a rotating magnetic field generated by an applied polyphase AC voltage (in many cases, a three-phase AC voltage) to stator windings. Although synchronous motors are efficient, they require additional device for starting and synchronizing.

In recent years, a superconducting rotating machine that is capable of synchronous rotation while having a configuration of an induction machine has been proposed (see Patent Literature 1 below). For example, Patent Literature 1 discloses a method of operating a superconducting rotating machine that enables slip rotation and synchronous rotation and allows the superconducting rotating machine to operate autonomously and stably.

CITATION LIST

Patent Literature

Patent Literature 1
  Japanese Patent Application Laid-Open No. 2013-55733

SUMMARY OF INVENTION

Technical Problem

For example, when a superconducting rotating machine including a conventional superconducting squirrel-cage winding as described above is brought into a superconducting state by being cooled below the critical temperature with a cooling device before starting operation, the superconducting squirrel-cage winding does not trap the magnetic flux of the rotating magnetic field of the stator windings. In this state, when a three-phase AC voltage is applied to the stator windings, a shielding current flows through the superconducting squirrel-cage winding, and the magnetic flux linking with the superconducting squirrel-cage winding becomes zero (hereinafter sometimes referred to as "magnetic shielding state"). In other words, since the magnetic flux supplied from the stator is shielded in the magnetic shielding state, the superconducting rotor does not start. Therefore, usually the voltage and frequency must be adjusted to induce a large current in the superconducting squirrel-cage winding for a certain period of time until the magnetic flux is linked so that the shielding current exceeds the critical current value (maximum current at which the magnetic shielding state is maintained: Ic) of the winding. Specifically, the voltage applied to the stator windings and/or the frequency of the applied voltage needs to be increased for a certain period of time until the current value flowing through the superconducting squirrel-cage winding (hereinafter, sometimes simply referred to as "current value (Io)") exceeds the critical current value (Ic), so that the superconducting squirrel-cage winding is brought from the magnetic shielding state to a magnetic flux flow state. In the magnetic flux flow state, the magnetic flux links with the superconducting squirrel-cage winding to generate an induced current (flux flow current), which generates an induced torque to generate a finite resistance. Therefore, the superconducting rotor is induced to rotate (hereinafter, the state in which the superconducting rotor is mainly driven by the induced torque is sometimes referred to as an "slip rotation mode").

After that, when the rotational motion of the superconducting rotor is accelerated, the relative speed between the rotating magnetic field and the superconducting rotor becomes smaller, and finally the induced current (flux flow current) flowing through the superconducting squirrel-cage winding falls below the critical current, the superconducting squirrel-cage winding traps the flux linkage. A state in which the superconducting squirrel-cage winding traps flux linkage (hereinafter sometimes referred to as a "magnetic flux trapping state") allows the superconducting rotor to rotate synchronously with respect to the rotating magnetic field (hereinafter, the state in which the superconducting rotor is rotated mainly by synchronous torque is sometimes referred to as "synchronous rotation mode").

Contrarily, if a superconducting rotating machine including a superconducting squirrel-cage winding has a magnetic flux that links with the superconducting squirrel-cage winding and the machine shifts to the slip rotation mode, the current required for driving becomes smaller from the current at the time of starting as inertial energy accumulates in the rotor. Therefore, the use of a power source capable of constantly supplying a large steady-state current required only for a short period of time at the time of starting has many disadvantages in terms of cost, size, and the like. Furthermore, a large starting current supplied to the superconducting rotating machine for a long time disadvantageously leads to energy loss, resulting in risk of an increased load on the power source and the rotating machine.

In addition, there is a great demand for reducing the start-up time of superconducting rotating machines including superconducting squirrel squirrel-cage windings as much as possible. In particular, a superconducting rotating machine including a superconducting squirrel-cage winding has energy loss generated as the time elapses in shifts from the magnetic shielding state to the magnetic flux trapping state via the magnetic flux flow state. Therefore, it is desirable to reduce the time required to shift to the synchronous rotation mode as much as possible. Furthermore, a superconducting rotating machine including a superconducting squirrel-cage winding needs to set the starting voltage to a drive voltage to obtain predetermined rotation characteristics after the magnetic flux flow state. Therefore, it is desired that the voltage control at the time of starting is simple. In addition, if a voltage higher than the voltage required for driving is continuously applied after the shift to the magnetic flux trapping state (synchronous rotation mode), the current may be converted to rotor torque, resulting in energy loss or a release from the synchronous rotation mode.

In these respects, conventional superconducting rotating machines still have room for improvement, and there is a demand for the development of technology that can easily shift from the magnetic shielding state to the magnetic flux trapping state (that is, the synchronous rotation mode) at the time of starting.

In order to solve the above problems, an object of the present invention is to provide a superconducting rotating machine capable of slip rotation and synchronous rotation and further capable of easily shifting to a magnetic flux flow state, and a method of controlling the same.

Solution to Problem

Conventionally, a shift of a superconducting rotating machine to a synchronous rotation mode has needed to induce a large current in the superconducting squirrel-cage winding for a certain period of time at the time of starting or the like. The inventors of the present invention have found that the superconducting rotating machine can be rapidly shifted to the synchronous rotation mode by applying a pulse voltage for a short period of time and superimposing it on the drive voltage, and have made the present invention.

The present invention provides a superconducting rotating machine, including: a stator that has a tubular stator iron core and stator windings wound around the stator iron core and generates a rotating magnetic field; a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars; a pulse voltage output unit that outputs a pulse voltage to shift the superconducting squirrel-cage winding to a magnetic flux flow state; and a drive voltage output unit that applies a drive voltage to the stator windings to rotationally drive the superconducting rotor, wherein the pulse voltage output from the pulse voltage output unit is superimposed on the drive voltage.

As described above, when the superconducting squirrel-cage winding is in a magnetic shielding state, the relationship between the current value (Io) (shielding current in this case) flowing through the superconducting squirrel-cage winding and the critical current value (Ic) is Io<Ic. According to the superconducting rotating machine of the present invention, when the superconducting squirrel-cage winding is in a magnetic shielding state at the time of starting or after driving, an extremely short time pulse voltage is applied to the superconducting rotating machine and superimposed on the drive voltage. This can quickly change the relationship between the current value (Io) flowing through the superconducting squirrel-cage winding and the critical current value (Ic) of the superconducting squirrel-cage winding from Io<Ic to Io>Ic. As a result, the superconducting squirrel-cage winding enters a magnetic flux flow state and shifts to the slip rotation mode quickly, so that the time until the subsequent shift to the synchronous rotation mode can be greatly reduced.

Similarly, when the superconducting squirrel-cage winding is in a magnetic flux trapping state, the relationship between the current value (Io) (in this case, persistent current) flowing through the superconducting squirrel-cage winding and the critical current value (Ic) is Io<Ic. According to the superconducting rotating machine of the present embodiment, when the superconducting squirrel-cage winding is in the magnetic flux trapping state in the synchronous rotation mode or the like, an extremely short time pulse voltage is applied to the superconducting rotating machine and superimposed on the drive voltage. This can quickly change the relationship between the current value (Io) flowing through the superconducting squirrel-cage winding and the critical current value (Ic) of the superconducting squirrel-cage winding from Io<Ic to Io>Ic. As a result, the superconducting squirrel-cage winding enters a magnetic flux flow state and quickly shifts to the slip rotation mode, so that magnetic flux can be retrapped when the trapped magnetic flux amount is insufficient.

One aspect of the present invention provides the superconducting rotating machine, wherein a voltage obtained by superimposing the pulse voltage on the drive voltage is equal to or higher than Vmin represented by the following formula.

$$V_{min} = \sqrt{r_1^2 + (x_1 + x_2')^2} \times Ic'$$

where Vmin is a phase voltage, $r_1$ is a stator windings resistance, $x_1$ is a leakage reactance of the stator windings, $x_2'$ is a leakage reactance of a rotor winding converted to a primary side, and Ic' is a critical current of the rotor bars converted to a primary side.

According to this aspect, the current value (Io) can be sufficiently increased by setting the pulse voltage to Vmin or more.

Another aspect of the present invention provides the superconducting rotating machine, wherein an application time (T) of the pulse voltage, an electrical time constant ($\tau_e$) of the superconducting rotating machine, and a mechanical time constant ($\tau_m$) of the superconducting rotating machine are represented by a formula: $\tau_e < T < \tau_m$.

According to this aspect, the application time (T) is set between the electrical time constant ($\tau_e$) and the mechanical time constant ($\tau_m$) of the superconducting rotating machine. This can prevent the occurrence of vibration or the like due to the conversion of the excessive pulse voltage into the driving energy of the superconducting rotor while generating a shielding current in the superconducting squirrel-cage winding. This further can prevent a synchronous rotation mode from being released after a shift to the synchronous rotation mode.

Yet another aspect of the present invention provides a superconducting rotating machine, including: a stator that has a tubular stator iron core and stator windings wound around the stator iron core and generates a rotating magnetic field; a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars; a drive voltage output unit that applies a drive voltage to the stator windings to rotate the superconducting rotor; a pulse voltage output unit that outputs a pulse voltage to shift the superconducting squirrel-cage winding to a magnetic flux flow state; and a pulse magnetic field output unit that generates a pulse magnetic field by a pulse voltage output from the pulse voltage output unit, wherein a pulse magnetic field output from the pulse magnetic field output unit is applied to the superconducting rotor.

According to this aspect, the critical current value (Ic) of the superconducting squirrel-cage winding can be reduced by converting the pulse voltage into a pulse magnetic field and applying the pulse magnetic field to the superconducting rotor. This can quickly set the relationship between the current value (Io) flowing through the superconducting squirrel-cage winding and the critical current value (Ic) of the superconducting squirrel-cage winding to Io>Ic.

Yet another aspect of the present invention provides the superconducting rotating machine, wherein the pulse voltage output unit and the drive voltage output unit are provided in an identical voltage output circuit.

According to this aspect, for example, when the waveform of the pulse voltage is a ramp wave such as a triangular wave, it is possible to output the pulse voltage and the drive voltage from a single voltage output circuit.

Yet another aspect of the present invention provides the superconducting rotating machine, wherein the pulse voltage output unit and the drive voltage output unit are provided in different voltage output circuits.

According to this aspect, for example, when the waveform of the pulse voltage is a rectangular wave, the pulse voltage and the drive voltage can be output from different voltage output circuits.

Yet another aspect of the present invention provides a method of controlling a superconducting rotating machine, the superconducting rotating machine including: a stator that has a tubular stator iron core and stator windings wound around the stator iron core and generates a rotating magnetic field; and a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars, the method including: a step of applying a drive voltage to the stator windings to rotationally drive the superconducting rotor; and a step of applying a pulse voltage to the superconducting rotating machine to superimpose the pulse voltage on the drive voltage in order to shift the superconducting squirrel-cage winding to a magnetic flux flow state.

According to the method of controlling the superconducting rotating machine of the present invention, as described above, when the superconducting squirrel-cage winding is in the magnetic shielding state at the time of starting or after driving, an extremely short time pulse voltage is applied to the superconducting rotating machine and superimposed on the drive voltage. This can quickly change the relationship between the current value (Io) (shielding current) flowing through the superconducting squirrel-cage winding and the critical current value (Ic) of the superconducting squirrel-cage winding from Io<Ic to Io>Ic. As a result, the superconducting squirrel-cage winding enters a magnetic flux flow state and shifts to the slip rotation mode quickly, so that the time until the subsequent shift to the synchronous rotation mode can be greatly reduced.

Similarly, when the superconducting squirrel squirrel-cage winding is in a magnetic flux trapping state, the relationship between the current value (Io) (persistent current) and the critical current value (Ic) is Io<Ic. According to the method of controlling the superconducting rotating machine of the present embodiment, when the superconducting squirrel-cage winding is in the magnetic flux trapping state in the synchronous rotation mode or the like, an extremely short time pulse voltage is applied to the superconducting rotating machine and superimposed on the drive voltage. This can quickly change the relationship between the current value (Io) flowing through the superconducting squirrel-cage winding and the critical current value (Ic) of the superconducting squirrel-cage winding from Io<Ic to Io>Ic. As a result, the superconducting squirrel-cage winding enters a magnetic flux flow state and quickly shifts to the slip rotation mode, so that the magnetic flux can be retrapped to an appropriate amount when the trapped magnetic flux amount is insufficient or excessive.

Yet another aspect of the present invention provides a method of controlling a superconducting rotating machine, the superconducting rotating machine including: a stator that has a tubular stator iron core and stator windings wound around the stator iron core and generates a rotating magnetic field; and a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars, the method including: a step of applying a drive voltage to the stator windings to rotationally drive the superconducting rotor; a step of outputting a pulse voltage to shift the superconducting squirrel-cage winding to a magnetic flux flow state, and converting the pulse voltage into a pulse magnetic field; and a step of applying the pulse magnetic field to the superconducting rotor.

According to this aspect, the critical current value (Ic) of the superconducting squirrel-cage winding can be reduced by converting the pulse voltage into a pulse magnetic field and applying the pulse magnetic field to the superconducting rotor. This can quickly set the relationship between the current value (Io) flowing through the superconducting squirrel-cage winding and the critical current value (Ic) of the superconducting squirrel-cage winding to Io>Ic.

Advantageous Effects of Invention

According to the present invention, in a superconducting rotating machine capable of induction rotation and synchronous rotation, it is possible to provide a superconducting rotating machine that can easily shift to a magnetic flux flow state, and a method of controlling the same.

DESCRIPTION OF EMBODIMENTS

Figure 1:
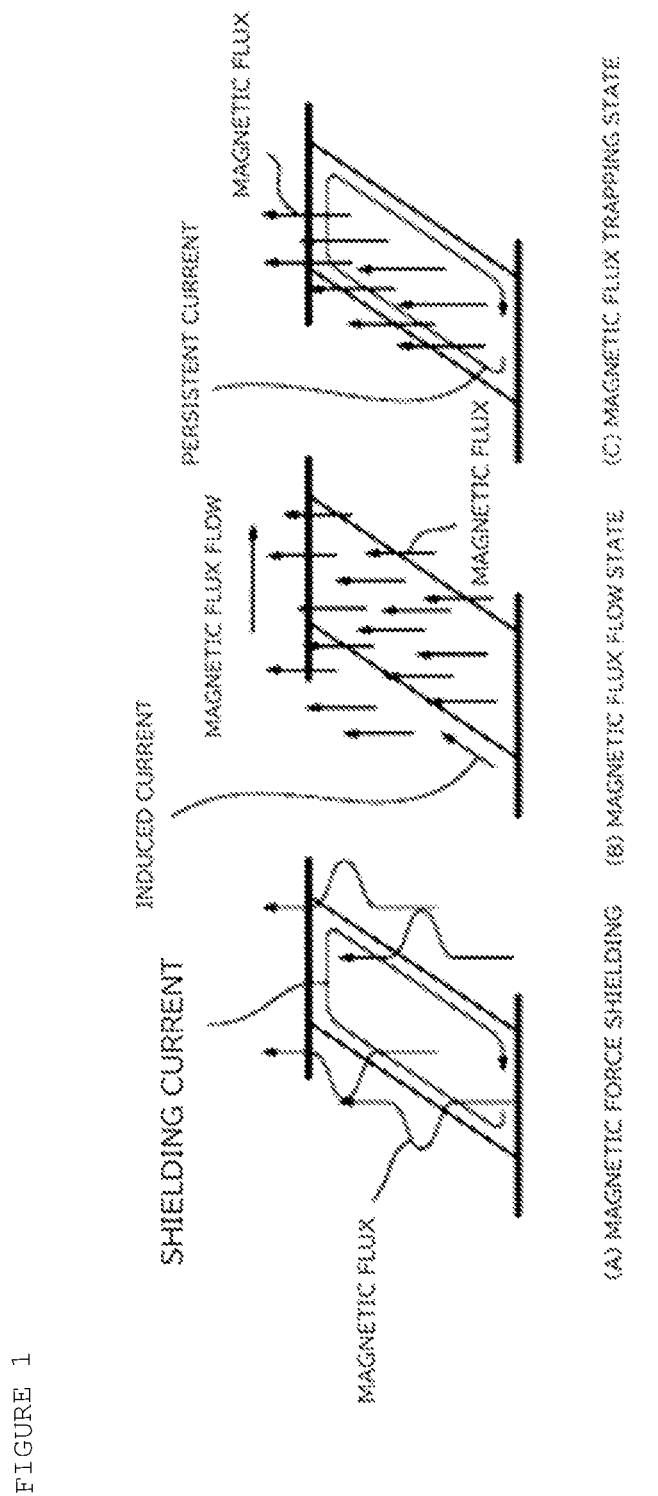
FIG. 1 is a schematic diagram for explaining a magnetic shielding state, a magnetic flux flow state, and a magnetic flux trapping state.

A superconducting rotating machine of the present embodiment and its control method will be described below with appropriate reference to figures. However, the present invention is not limited to the following embodiments. In addition, in the following description, the same or corresponding members are denoted by the same reference numerals, and their description may be omitted. Note that, in the present specification, unless otherwise specified, the AC voltage applied to the superconducting rotating machine is a polyphase AC voltage (for example, a three-phase AC voltage). Further, unless otherwise specified, the voltage applied to the superconducting rotating machine means "line voltage".

As described above, the superconducting rotating machine of the present embodiment includes a superconducting rotor, and drives a superconducting squirrel-cage winding with superconducting conductors, so that the rotating machine can be driven mainly by synchronous torque although the rotating machine is an induction motor. The superconducting rotating machine of the present embodiment has the superconducting rotor changing from a magnetic shielding state to a magnetic flux flow state and then to a magnetic flux trapping state, so that the machine can be driven mainly by synchronous torque. The superconducting rotating machine of the present embodiment includes a pulse voltage output unit. When the superconducting squirrel-cage winding is in a magnetic shielding state or magnetic flux trapping state, a pulse voltage is applied to the superconducting rotating machine to be superimposed on a drive voltage, so that the machine can be quickly shift to the magnetic flux flow state.

The superconducting rotating machine of the present embodiment outputs a pulse voltage from the pulse voltage output unit and superimposes the pulse voltage on the drive voltage in order to shift the superconducting squirrel-cage winding to a magnetic flux flow state. Specifically, the superconducting rotating machine of the present embodiment can do the following: 1) to output a pulse voltage from the pulse voltage output unit to quickly shift the superconducting squirrel-cage winding to the magnetic flux flow state when the winding is in the magnetic shielding state; and 2) to output a pulse voltage from the pulse voltage output unit to quickly shift the superconducting squirrel-cage winding to the magnetic flux flow state when the winding is in the magnetic flux trapping state.

In the case of 1) above, when the superconducting squirrel-cage winding is in a magnetic shielding state such as at the time of starting, the superconducting rotating machine of the present embodiment outputs a pulse voltage and superimposes the pulse voltage on the drive voltage to enable a quick shift to the magnetic flux flow state. As a result, the superconducting rotating machine of the present embodiment quickly shifts to the slip rotation mode and then to the synchronous rotation mode after starting. This allows the machine to significantly reduce the time required to shift to the synchronous rotation mode as compared with the case in which the pulse voltage is not used.

In the case of 2) above, when the superconducting rotating machine of the present embodiment is driven in the synchronous rotation mode, the machine outputs a pulse voltage and superimposes the pulse voltage on the drive voltage to allow the superconducting squirrel-cage winding to shift from the magnetic flux trapping state to the magnetic flux flow state. As a result, for example, when insufficient or excessive trapped amount of magnetic flux in the synchronous rotation mode requires adjustment in the trapped magnetic flux amount, the superconducting squirrel-cage winding can be shift to the magnetic flux flow state by the pulse voltage to retrap the magnetic flux of the rotating magnetic field. At this time, the shift to the magnetic flux flow state causes the superconducting rotating machine to shift from the synchronous rotation mode to the slip rotation mode. Since the rotational speed of the superconducting rotor in the shift is less reduced, the synchronous rotation mode can be quickly returned after the magnetic flux is trapped.

The magnetic shielding state, magnetic flux flow state, and magnetic flux trapping state in the present embodiment will be described below with reference to figures. FIG. 1 is a schematic diagram for explaining a magnetic shielding state, a magnetic flux flow state, and a magnetic flux trapping state. FIG. 1 shows electromagnetic phenomena in one loop of superconducting squirrel-cage winding (see 22A in FIG. 2 which will be described later).

When the superconducting rotating machine of the present embodiment is driven, the stationary superconducting squirrel-cage winding is cooled below the critical temperature by a cooling device. At this time, the superconducting squirrel-cage winding is in a superconducting state but does not trap the magnetic flux caused by stator windings. In this state, when a three-phase AC voltage is applied to the stator windings, a shielding current flows through the superconducting squirrel-cage winding, resulting in a magnetic shielding state. In the magnetic shielding state, the relationship between the current value (Io) of the shielding current flowing through the superconducting squirrel-cage winding and the critical current value (Ic) is Io<Ic. Therefore, the magnetic flux linking with the superconducting squirrel-cage winding is zero (see FIG. 1(A)). In this case, no synchronous torque is generated and no induced current flows, so that no induced (slip) torque is generated.

Then, in order to drive the superconducting rotating machine of the present embodiment, first, the superconducting squirrel-cage winding is shifted from the magnetic shielding state to the magnetic flux flow state. In order to shift the superconducting squirrel-cage winding to the magnetic flux flow state, the current value (Io) flowing through the superconducting squirrel-cage winding needs to be higher than the critical current (Ic) (Io>Ic) to release the winding from the magnetic shielding state due to the shielding current. In the superconducting rotating machine of the present embodiment, application of a pulse voltage to the superconducting rotating machine and superimposition of the pulse voltage on the drive voltage can quickly set the relationship between the current value (Io) of the shielding current and the critical current (Ic) to Io>Ic. When the superconducting squirrel-cage winding shifts to the magnetic flux flow state, the magnetic flux of the rotating magnetic field is allowed to link with the superconducting squirrel cage winding. Therefore, an induced current (flux flow current) flows through the superconducting squirrel-cage winding (see FIG. 1(B)). As a result, a finite resistance is generated between the rotating magnetic field and the superconducting rotor, and the superconducting rotor is induced to rotate (slip rotation mode).

After that, the superconducting rotor is accelerated, accordingly the relative speed between the rotating magnetic field and the superconducting rotor decreases, and the current flowing in the superconducting rotor automatically decreases. Finally, when the current value (Io) of the current flowing through the superconducting rotor falls below the critical current value (Ic), the superconducting rotor traps the flux linkage, and the superconducting squirrel-cage winding shifts from the magnetic flux flow state to the magnetic flux trapping state (see FIG. 1(C)). In the magnetic flux trapping state, the superconducting rotor can trap the magnetic flux of the rotating magnetic field and can be rotated mainly by the synchronous torque (synchronous rotation mode).

<<Superconducting Rotating Machine>>

<Motor Body>

Figure 2:
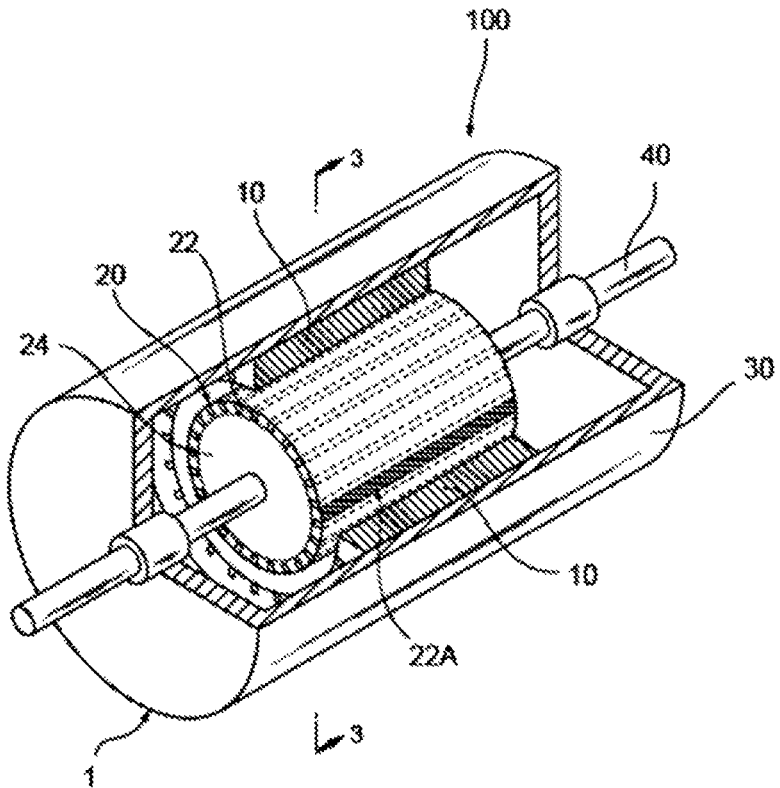
FIG. 2 is a schematic diagram showing one example of a motor body of a superconducting rotating machine.
Figure 3:
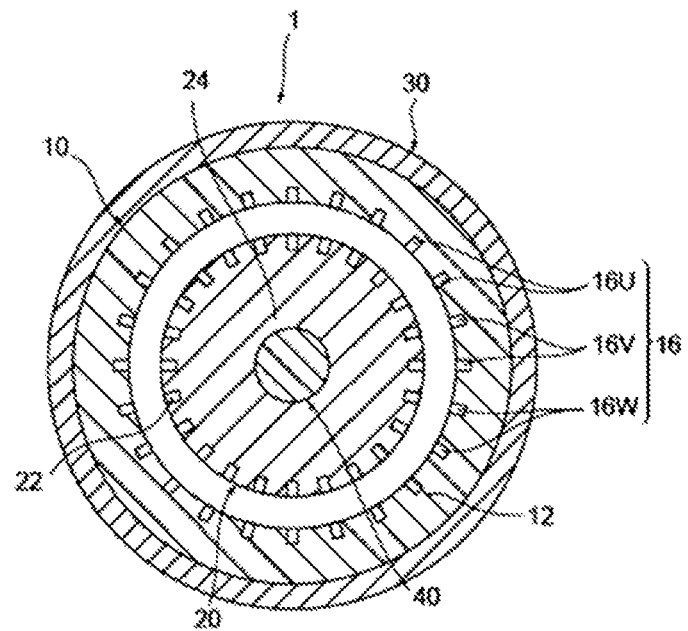
FIG. 3 is an explanatory diagram showing a relationship between a stator and a superconducting rotor.

One preferred aspect of a motor body of the present embodiment will be described with reference to figures in the drawings. FIG. 2 is a schematic diagram showing one example of the motor body of a superconducting rotating machine 100 of the present embodiment. FIG. 3 is a 3-3 cross-sectional view of the motor body 1 in FIG. 2, and is an explanatory diagram showing a relationship between a stator and a superconducting rotor. As shown in FIG. 2, the superconducting rotating machine 100 includes a motor body 1. The motor body 1 includes a stator 10 that generates a rotating magnetic field and a superconducting rotor 20 that is rotatably held on the inner peripheral side of the stator 10. Also, the stator 10 and the superconducting rotor 20 are housed in a cylindrical case 30. As described below, the superconducting rotating machine 100 of the present embodiment has the superconducting rotor 20 that is rotated around the rotating shaft 40 by applying a three-phase current to the stator 10.

(Stator)

As shown in FIGS. 2 and 3, the stator 10 has a tubular stator iron core 12 and stator windings 16U, 16V and 16W wound around the stator iron core 12 and made of superconducting wire rod. Hereinafter, these stator windings may be simply referred to as "stator windings 16". Passing a three-phase current through the stator windings 16 generates a rotating magnetic field.

The stator iron core 12 is a tubular member with an annular cross section in the radial direction. Alternatively, the stator iron core 12 can be made of a member in which electromagnetic steel plates such as silicon steel plates are laminated in the axial direction. The stator iron core 12 is provided with slots (not shown), and the stator windings 16 are accommodated in the slots. Although the stator iron core 12 is fixed to the inner wall of the case 30 of the motor body 1 in FIG. 2, the stator iron core may be fixed to the inner wall of the case 30 via a joint portion. Note that a stator having slots is used in the present embodiment. However, the present invention is not limited to this aspect, and it is possible to use a stator with open slots or grooves instead of the slots.

The stator windings 16 are formed by bundling a plurality of superconducting wires (bismuth-based high-temperature superconducting wire rods in the present embodiment), and each wire rod has a rectangular cross-sectional shape (but is not limited to this cross-section). A superconducting wire rod is configured with a plurality of bismuth-based high-temperature superconducting filaments coated with a highly conductive metal such as copper, aluminum, silver, or gold.

Note that, from the viewpoint of ease at the time of starting of the superconducting rotating machine 100, the superconducting wire rod to be used for the stator windings 16 of the stator 10 is preferably a superconducting wire rod having a critical temperature higher than that of the superconducting wire rod to be used for a superconducting squirrel-cage winding 22.

As described above, the stator windings 16 are inserted through slots on the surface of the stator iron core 12 and serve as coils. In the present embodiment, 24 slots are provided on the inner peripheral surface side of the stator iron core 12 so as to be arranged at regular intervals in the circumferential direction. Further, as shown in FIG. 3, the stator windings 16 are placed (wound) clockwise along the circumferential direction of the stator iron core 12 so that a rotating magnetic field is generated in the order of the stator windings 16U, 16V and 16W.

In the present embodiment, the stator windings 16 are three-phase windings and are connected to each other. Superconducting rotating machine 100 is a three-phase motor, and the stator windings 16 is respectively assigned to U-phase coil, V-phase coil, and W-phase coil. In other words, 24 superconducting coils are disposed in the stator iron core 12. That is, eight U-phase superconducting coils (stator winding 16U), eight V-phase superconducting coils (stator winding 16V), and eight W-phase superconducting coils (stator winding 16W) are disposed in the stator iron core 12. Each of the eight U-phase superconducting coils is electrically connected in series, each of the eight V-phase superconducting coils is electrically connected in series, and each of the eight W-phase superconducting coils is electrically connected in series. Note that the method of connecting each stator winding 16 may be a series connection or a parallel connection.

The method of connecting each stator winding 16 is not particularly limited, and may be star connection, delta connection, or the like. The method of winding the stator windings 16 around the stator iron core 12 may be concentrated winding or distributed winding. In the present embodiment, passing a three-phase current through the stator windings 16 forms a rotating magnetic field with four poles in the stator iron core 12. Note that, in the present embodiment, the stator windings 16 each have 12 turns per pole and phase.

The stator 10 is electrically coupled with a drive circuit for applying a drive voltage to the stator windings 16 and a pulse applying circuit for applying a pulse voltage to be superimposed on the drive voltage to the stator windings 16.

(Superconducting Rotor)

Figure 4:
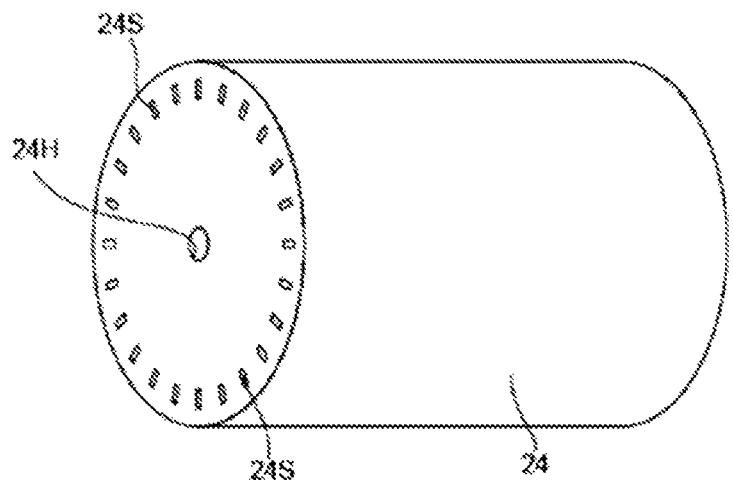
FIG. 4 is an explanatory diagram showing one example of a configuration of a superconducting rotor.
Figure 4:
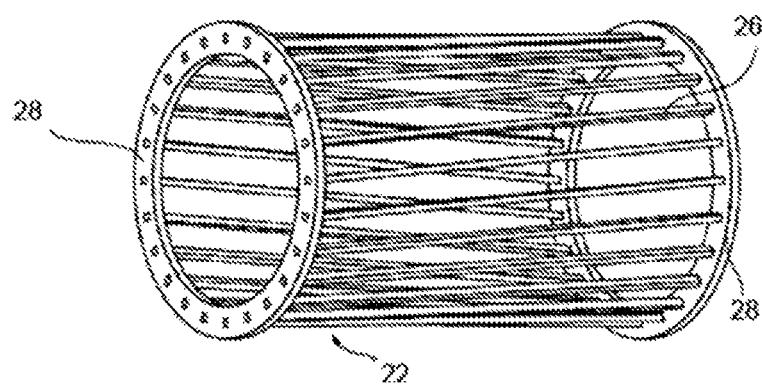

As shown in FIGS. 2 and 3, the superconducting rotating machine 100 of the present embodiment includes a superconducting rotor 20 rotatably held on the inner peripheral side of the stator 10. Further, as shown in FIGS. 3 and 4, the superconducting rotor 20 includes a superconducting squirrel-cage winding 22 and a rotor iron core 24. FIG. 4 is an explanatory diagram showing one example of the configuration of a superconducting rotor.

As shown in FIG. 3, the superconducting rotor 20 is placed on the inner peripheral side of the stator 10 with a predetermined interval. Then, as shown in FIG. 4(A), the rotor iron core 24 of the superconducting rotor 20 is cylindrical, and includes a plurality of slots 24S on its outer peripheral surface side for accommodating rotor bars of a rotor winding. The superconducting rotor 20 further includes a rotating shaft 40 coaxially attached to the rotor iron core 24. The superconducting rotor 20 also includes the superconducting squirrel-cage winding 22 having rotor bars 26 and end rings 28 made of superconducting wire rods shown in FIG. 4(B). Note that, although the rotor having slots is used in the present embodiment, the present invention is not limited to this aspect and it is also possible to use rotors with open slots or grooves instead of the slots.

The rotor iron core 24 can be formed by laminating electromagnetic steel plates such as silicon steel plates in the axial direction. As shown in FIG. 4(A), in the central part of the rotor iron core 24, a rotating shaft receiving hole 24H for receiving the rotating shaft 40 is formed. Further, as described above, in the vicinity of the outer periphery of the rotor iron core 24, a plurality of slots 24S penetrating in the axial direction are formed at predetermined intervals in the circumferential direction. In addition, in the present embodiment, the slots 24S are formed obliquely with respect to the axial direction of the rotor iron core 24 and have an oblique slot (skew) configuration. However, the present invention is not limited to this aspect, and the slots 24S may be parallel to the axial direction of the rotor iron core 24 (the angle between the axial direction of the rotor iron core 24 and the slots 24S is 0°), for example.

As shown in FIG. 4(B), the superconducting squirrel-cage winding 22 is composed of a plurality of rotor bars 26 and a pair of annular end rings 28 that short-circuit the ends of each rotor bar 26. A plurality of the rotor bars 26 are accommodated in the slots 24S of the rotor iron core 24.

The rotor bar 26 is formed by bundling a plurality of superconducting wire rods (bismuth-based high-temperature superconducting wire rods in the present embodiment) and has a rectangular cross section (however, the cross section is not limited to a rectangular cross section). A superconducting wire rod can be configured with, for example, a plurality of bismuth-based high-temperature superconducting filaments coated with a highly conductive metal such as copper, aluminum, silver, or gold. The number of rotor bars 26 is the same as the number of slots 24S of rotor iron core 24. In other words, in the present embodiment, there are 24 rotor bars 26 and 24 slots 24S.

The rotor bars 26 are placed at predetermined intervals in the circumferential direction and obliquely with respect to the axial direction of the squirrel-cage so as to form the squirrel-cage with a cylindrical and skew structure. However, the present invention is not limited to this aspect. As described above, for example, the superconducting squirrel-cage winding 22 may be configured such that the rotor bars 26 are parallel to the axial direction of the rotor iron core 24 (the angle between the axial direction of the rotor iron core 24 and the rotor bar 26 is 0°).

Each rotor bar 26 is longer than the axial length of the rotor iron core 24, and protrudes from the slot 24S when accommodated in the slot 24S. The end rings 28 are made of a superconducting wire rod such as a bismuth-based high-temperature superconducting wire rod, like the rotor bars 26. The pair of end rings 28 are respectively joined to each ends of the rotor bar 26 protruding from the slot 24S.

Note that, although the present embodiment is described with the case of using the superconducting rotor 20 in which only the superconducting squirrel-cage winding 22 is installed in the rotor iron core 24, the superconducting rotating machine 100 may be configured to have a normal-conducting squirrel-cage winding in addition to the superconducting squirrel-cage winding. Examples of the normal-conducting material to be used for the normal-conducting squirrel-cage winding include highly conductive materials such as copper, aluminum, silver, and gold.

The rotating shaft 40 is attached by being inserted into the rotating shaft receiving hole 24H of the rotor iron core 24. The rotating shaft 40 is rotatably supported in the case 30 via a shaft receivers such as bearings (not shown).

Hereinafter, the method of controlling and driving the superconducting rotor according to the present embodiment will be described with embodiments as examples. Note that, although a first embodiment, a second embodiment, and modifications thereof will be described throughout the present specification, the priority of the embodiments of the present invention is not limited by the order of description of these embodiments.

First Embodiment

As the first embodiment, an aspect will be described in which the pulse voltage output unit applies a rectangular pulse wave to the stator windings to superimpose it on the drive voltage.

Figure 5:
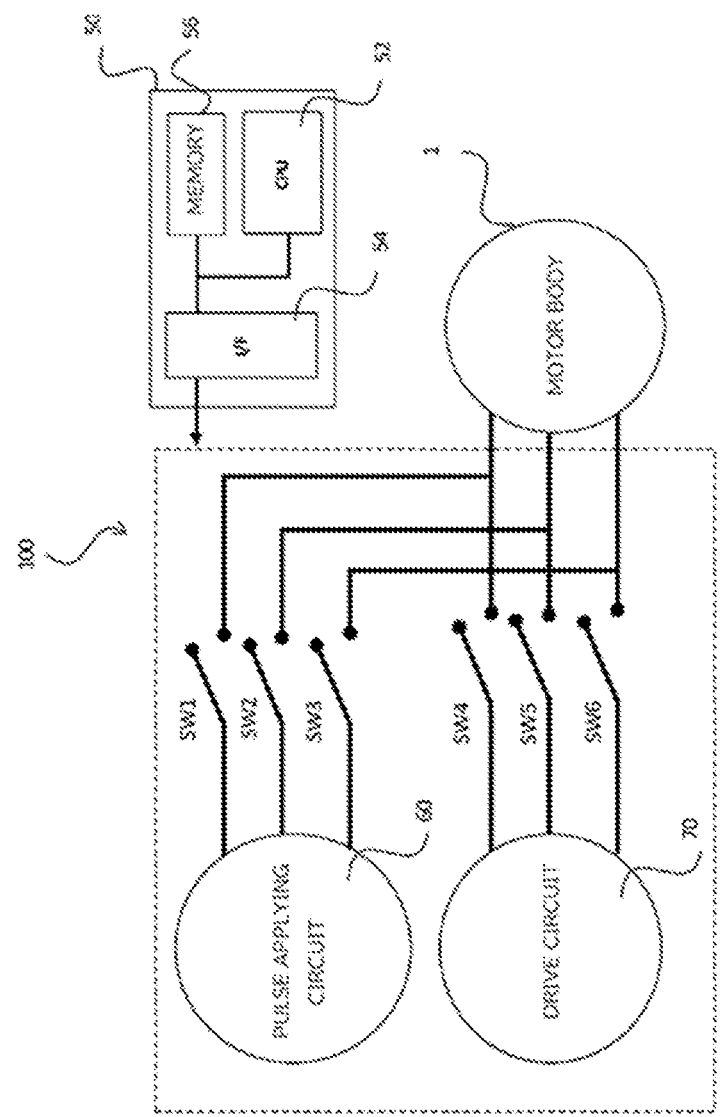
FIG. 5 is a block diagram showing one aspect of a configuration of the superconducting rotating machine of the present embodiment.

The drive circuit and the pulse applying circuit of the present embodiment will be described with reference to FIG. 5. FIG. 5 is a block diagram showing one aspect of the configuration of the superconducting rotating machine of the present embodiment.

As shown in FIG. 5, the superconducting rotating machine 100 includes a motor body 1 (three-phase HTS-ISM motor), a control circuit 50, a pulse applying circuit 60, and a drive circuit 70. In the present embodiment, a pulse output unit and a drive voltage output unit are configured as separate circuits.

The control circuit 50 outputs control signals to control opening and closing of the switches SW1 to SW6. Further, the control circuit 50 controls the time, timing, voltage, and frequency of the pulse voltage output from the pulse applying circuit 60. Also, the control circuit 50 controls the time, timing, voltage and frequency of the drive voltage output from the drive circuit 70.

As shown in FIG. 5, the control circuit 50 includes a CPU (central processing unit) 52, an interface (I/F) 54, and a memory 56. The control circuit 50 can be configured on the basis of an application-specific circuit such as an ASIC (application specific integrated circuit).

The CPU 52 executes commands according to the control program and controls the switches SW1 to SW6, the pulse applying circuit 60, the drive circuit 70, and the like. The interface 54 outputs control signals for controlling the pulse applying circuit 60 and the drive circuit 70, and control signals for controlling the open/close states of the switches SW1 to SW6. The memory 56 includes ROM (read only memory) and RAM (random access memory) serving as a main recording unit, and volatile or non-volatile memory serving as an auxiliary recording unit. The control program described above may be stored in either the main recording unit or the auxiliary recording unit.

The pulse applying circuit 60 is a PWM control inverter that includes a capacitor, and is a circuit that applies a rectangular pulse voltage to the motor body 1. The pulse applying circuit 60 is connected to the stator windings of the motor body 1 via switches SW1 to SW3 so as to be able to apply a pulse voltage. The pulse applying circuit 60 converts a voltage supplied from a power source (not shown) into a three-phase rectangular pulse voltage (square pulse) and applies the pulse voltage to the stator.

The drive circuit 70 is a PWM control inverter and applies a drive voltage to the motor body 1. The drive circuit 70 is connected to each stator winding of the motor body 1 so as to be able to apply a drive voltage thereto via the switches SW4 to SW6. The drive circuit 70 converts the voltage supplied from the power source (not shown) into a three-phase voltage, and applies it to the stator of the motor body 1 as a drive voltage.

(Pulse Voltage)

Figure 6:
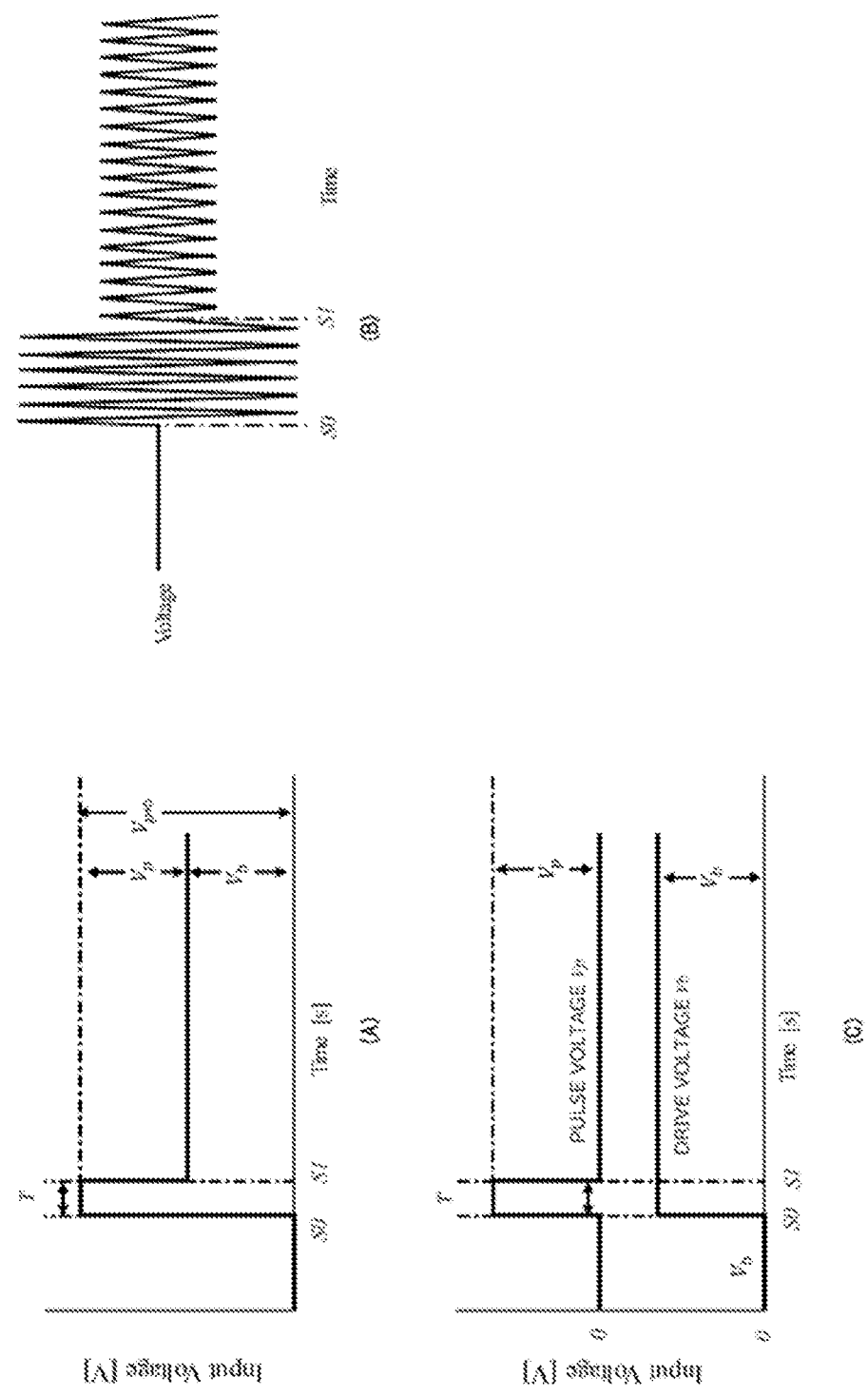
FIG. 6 is a graph showing a relationship between a waveform of a pulse voltage, a pulse voltage (Vp), and a drive voltage (Vb) in a first embodiment.

In the present embodiment, a rectangular pulse voltage is applied from the pulse applying circuit 60 to the stator windings in order to be superimposed on the drive voltage output from the drive circuit 70. FIG. 6 is a graph showing a relationship between a pulse voltage waveform, a pulse voltage (Vp), and a drive voltage (Vb) in the first embodiment. In FIG. 6, the vertical axis of FIG. 6(A) indicates an input voltage (rectangular pulse wave) to the stator windings and the horizontal axis indicates the time. FIG. 6(B) shows the relationship between the variation of the input voltage supplied to the stator windings and the time with an enlarged time axis. FIG. 6(C) is a schematic diagram showing the application timing of the pulse voltage (Vp) and the drive voltage (Vb).

As shown in FIGS. 6(A) to 6(C), in the present embodiment, the control circuit 50 controls the drive circuit 70 so as to apply the drive voltage (Vb) to the stator windings at the timing of time S0. In addition, the control circuit 50 controls the pulse applying circuit 60 so as to apply a rectangular pulse wave to the stator windings to superimpose the pulse voltage (Va) on the drive voltage (Vb) during time S0 to time S1.

Here, the drive voltage (Vb) is controlled so as to properly rotate the superconducting rotating machine after the superconducting rotor shifts to a rotating state, and is preferably set so as to satisfy maximum efficiency conditions at the time of steady-state driving. Also, at the time of starting, the voltage is normally set to a voltage that satisfies the maximum torque. As shown in FIG. 6, when the pulse voltage (Vp) applied from the pulse applying circuit 60 is superimposed on the drive voltage (Vb), the voltage (Vp+b) after superimposition is set higher than the drive voltage (Vb) at the time of steady-state driving.

Here, throughout the present specification, the "pulse voltage" output from the pulse voltage output unit is a voltage to be used to shift the state of the superconducting squirrel-cage winding, and is preferably a voltage having an application time of two seconds or less. Although not particularly limited, from the viewpoint of reducing the starting time (time to reach synchronous rotation mode), the application time of the pulse voltage is more preferably one second or less, particularly preferably 0.5 seconds or less. In addition, the waveform of the pulse voltage is not particularly limited, and may be a rectangular wave, a ramp wave, a sawtooth wave, or the like.

When a pulse voltage is applied to the stator windings as in the present embodiment, from the viewpoint of making the current value (Io) flowing through the superconducting squirrel-cage winding higher than the critical current value (Ic) within a preferable voltage application time, a voltage (Vp+b) obtained by superimposing the pulse voltage (Vp) applied from the pulse applying circuit 60 on the drive voltage (Vb) is preferably Vmin or higher in which Vmin is represented by the following formula.

$$V_{min} = \sqrt{r_1^2 + (x_1 + x_2')^2} \times Ic'$$

where Vmin is a phase voltage, $r_1$ is a stator windings resistance, $x_1$ is a leakage reactance of the stator windings, $x_2'$ is a leakage reactance of the rotor winding converted to the primary side, and Ic' is a critical current of the rotor bar converted to the primary side.

In the formula, $r_1$, which is the stator windings resistance, $x_1$, which is a leakage reactance of the stator windings, $x_2'$, which is a leakage reactance of the rotor windings converted to the primary side, and Ic', which is the critical current of rotor bar converted to the primary side, can be calculated with reference to: "T Nakamura, et al., "Novel rotating characteristics of a squirrel-cage-type HTS induction/synchronous motor", Superconductor Science and Technology, vol. 20 (2007) 911-918"; and general no-load rotation test or locked rotor test. Note that the critical current (Ic') of the rotor bar converted to the primary side can be calculated from Ic'=Ic/α, where Ic is the critical current of the rotor bar, α is the number of stator windings/the number of rotor windings (usually assumed to be 1).

Furthermore, in the case in which a pulse voltage is applied to the stator windings as in the present embodiment, it is preferable that the voltage (Vp+b) obtained by superimposing the pulse voltage (Vp) on the drive voltage is set with reference to the voltage necessary to trap the magnetic flux necessary to start the motor in appropriate driving conditions, which are the rotational speed and torque, (hereinafter, sometimes referred to as "voltage (Vw)"). Contrarily, if the pulse voltage (Vp) is too high, the pulse voltage may be converted into kinetic energy of the rotor, etc., causing adverse effects such as vibration, which may be a factor in inability to maintain the synchronous rotation mode. Considering this point of view, the upper limit value (Vmax) of the voltage (Vp+b) obtained by superimposing the pulse voltage (Vp) on the drive voltage (Vb) can be set to a value of about 1.4 times Vw.

Considering the above point of view, the range of the voltage (Vp+b) obtained by superimposing the pulse voltage (Vp) on the drive voltage (Vb) is preferably Vb≤Vp+b≤Vmax, more preferably Vmin≤Vp+b≤Vmax, and particularly preferably Vw≤Vp+b≤Vmax.

Figure 7:
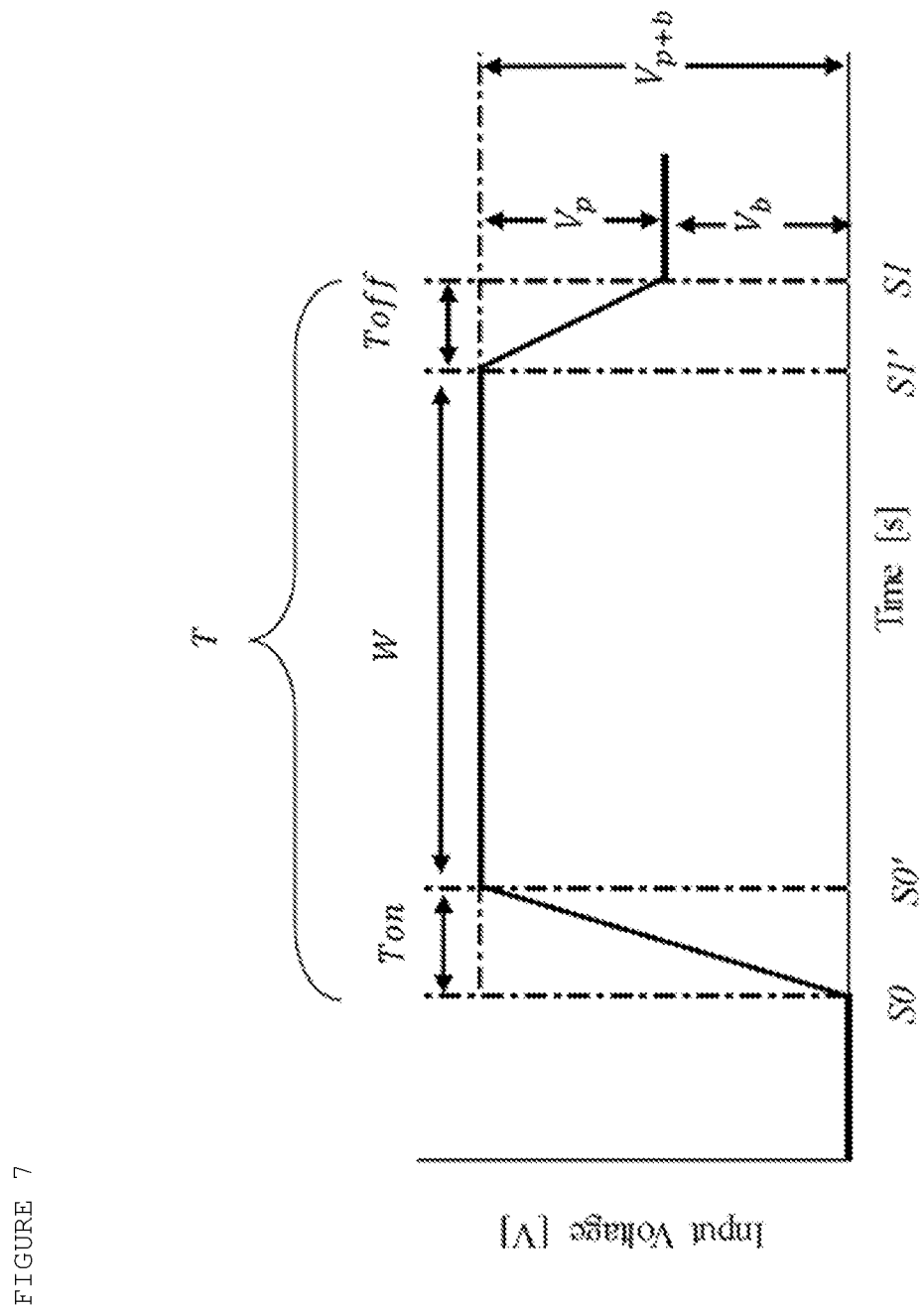
FIG. 7 is a schematic diagram showing a relationship between an application time (T), $t_{on}$, W, and $t_{off}$ of a pulse voltage.

The pulse voltage application time (T) means the time (s) from the application start time (start time of rise: S0) of the pulse voltage to the application end time (end time of fall: S1) of the pulse voltage in FIG. 6. The application time (T) of the pulse voltage can be set in a relationship between an electrical time constant ($\tau_e$) of the superconducting rotating machine and a mechanical time constant ($\tau_m$) of the superconducting rotating machine. Strictly speaking, the application time (T) is the sum of to, W, and $t_{off}$ (that is, T=$t_{on}$+W+$t_{off}$), as shown in FIG. 7, where: the $t_{on}$ is the time from when the voltage starts being applied to when the voltage reaches the voltage (Vp+b) obtained by superimposing the pulse voltage (Vp) on the drive voltage (Vb); W is the time from when the voltage reaches the voltage (Vp+b) to when the pulse voltage starts falling; and $t_{off}$ is the time from when the pulse voltage starts falling to when the voltage reaches the drive voltage (Vb). However, in the rectangular wave, $t_{on}$ and $t_{off}$ are extremely short time. Therefore, W can be regarded as the application time (T) in a relationship between the electrical time constant ($\tau_e$) of the superconducting rotating machine and the mechanical time constant ($\tau_m$) of the superconducting rotating machine. Note that FIG. 7 is a schematic diagram showing the relationship between the pulse voltage application time (T), $t_{on}$, W, and $t_{off}$ and does not show the actual ratios of T, $t_{on}$, W, and $t_{off}$. Note that the electrical time constant ($\tau_e$) of the superconducting rotating machine and the mechanical time constant ($^{TM}$) of the superconducting rotating machine can each be calculated from a general locked rotor test or a general no-load rotation test.

Here, the electrical time constant ($\tau_e$) can be obtained from "$\tau_e$=L/R" with the average inductance (L: H) of each phase of the superconducting rotating machine and the resistance value (R: Ω) of the stator winding of each phase.

Note that the average inductance of each phase can be obtained by "average flux linkage Ψ/current".

Also, the mechanical time constant ($\tau_m$) of the superconducting rotating machine can be obtained from "$\tau_m$=J/D" with the moment of inertia of the superconducting rotor (J: Nms$^2$/rad) and the friction coefficient of the superconducting rotor (D: Nms/rad).

It is preferable that the application time (T) of the pulse voltage described above be sufficiently higher than the electrical time constant ($\tau_e$) to generate a sufficient current in the superconducting squirrel-cage winding. In addition, it is preferable that the pulse voltage application time (T) be sufficiently smaller than the mechanical time constant ($\tau_m$) to prevent an excess pulse voltage from being converted into kinetic energy to affect the rotation of the superconducting rotor.

There are no particular limitations on the above $t_{on}$ and $t_{off}$. However, from the viewpoint of efficiently raising the pulse voltage and increasing the range of the pulse voltage (Vp) and application time (T) to enable the shift to the synchronous rotation mode, the $t_{on}$ in the rectangular wave is preferably about $10^{-5}$ to $10^{-2}$ seconds. Similarly, from the viewpoint of reducing the influence on the rotation of the superconducting rotor due to the sudden voltage drop that occurs when the pulse voltage falls, the $t_{off}$ in the rectangular wave is preferably about $10^{-5}$ to $10^{-2}$ seconds.

[Method of Driving Superconducting Rotating Machine]

The superconducting rotating machine 100 configured as described above is widely applicable to applications in which rotating machines are used, such as automobiles (small automobiles, medium automobiles, large automobiles such as buses and trucks), railroads, submarines, aircrafts, ships, and liquid circulation transfer pumps. The machine 100 can be applied to, for example, a superconducting motor system described in International Publication No. WO2009/116219.

For example, the superconducting rotating machine 100 can be applied to a system provided with driven means such as wheels, propellers, and screws that are rotated by being coupled to the rotating machine. The system includes, for example, a superconducting rotating machine 100, a driven means such as a wheel coupled directly or via another member to the superconducting rotating machine 100, a cooling device capable of cooling the superconducting rotating machine 100 until it is in a superconducting state, and a battery for driving the superconducting rotating machine 100.

Figure 8:
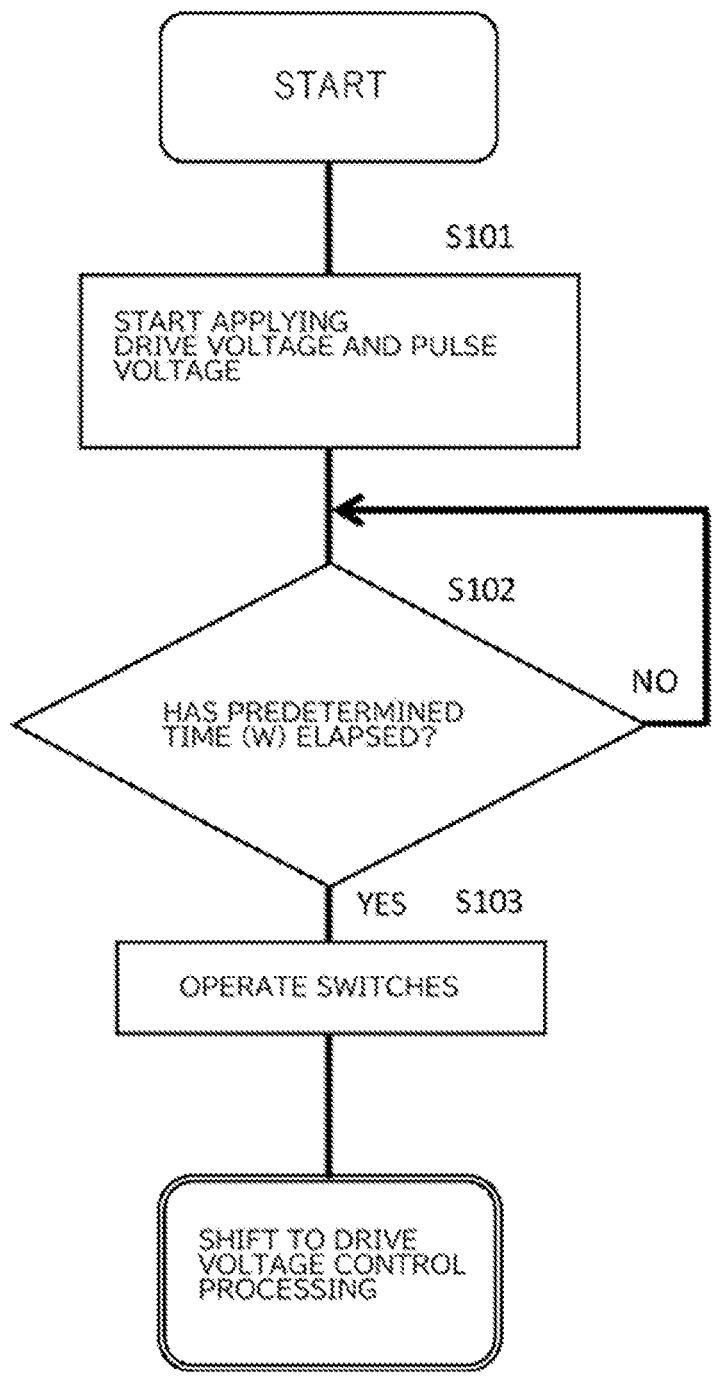
FIG. 8 is a flowchart for explaining a method of starting the superconducting rotating machine 100.

The following describes a method of driving a superconducting rotating machine with superconducting squirrel-cage winding in a magnetic flux flow state with a pulse voltage with reference to FIG. 8. FIG. 8 is a flowchart for explaining a method of starting a superconducting rotating machine. However, the present invention is not limited to this aspect.

First, the superconducting rotating machine 100 has the stator windings 16 and the superconducting squirrel-cage winding 22 that are cooled by a cooling device before starting and are in a superconducting state. The cooling device is not particularly limited as long as it can cool the superconducting stator 10 and the superconducting squirrel-cage winding 22 in the superconducting rotating machine 100 until the stator 10 and the squirrel-cage winding 22 are in a superconducting state (below the critical temperature). For example, a cooling device can be used that includes a coolant such as helium gas or liquid nitrogen.

When the superconducting rotating machine 100 is started, the control circuit 50 turns on SW1 to SW6, to apply a drive voltage from the drive circuit 70 and to start applying a pulse voltage from the pulse applying circuit 60 to the superconducting rotating machine 100 in order to shift the superconducting squirrel-cage winding 22 to a magnetic flux flow state (step S101). In the present embodiment, in order to trap the magnetic flux necessary to start the motor in appropriate driving conditions (rotational speed and torque), the control circuit 50 adjusts the amplitude and frequency of the AC voltage of the pulse applying circuit 60, to apply a rectangular pulse voltage (Vp) to the stator windings 16 and superimpose it on the drive voltage so that the voltage when the pulse voltage is superimposed on the drive voltage is higher than the drive voltage at the time of steady-state driving and the voltage when the pulse voltage is superimposed on the drive voltage is higher than the above Vmin and Vw and less than Vmax. As a result, the current value (Io) of the shielding current of the superconducting squirrel-cage winding 22 becomes higher than the critical current value (Ic). This causes the superconducting squirrel-cage winding 22 to shift from the magnetic shielding state to the magnetic flux flow state, so that the superconducting rotor 20 starts rotating in the slip rotation mode.

The control circuit 50 applies the pulse voltage from the pulse applying circuit 60 to the superconducting rotating machine 100 until the predetermined time (W) elapses (NO at step S102). As described above, strictly speaking, there are the time ($t_{on}$) and the time ($t_{off}$) before and after the predetermined time (W), where: the time ($t_{on}$) is the time from when the voltage starts being applied to when the voltage reaches the voltage (Vp+b) obtained when the pulse voltage is superimposed on the drive voltage; and the time ($t_{off}$) is the time from when the pulse voltage starts falling to when the voltage reaches the drive voltage (Vb). Therefore, the actual application time (T) is $t_{on}$+W+$t_{off}$. The predetermined time (W) can be determined based on the relationship between the electrical time constant ($\tau_e$) of the superconducting rotating machine 100 and the mechanical time constant ($\tau_m$) of the superconducting rotating machine so that $\tau_e$<T<$\tau_m$.

In the present embodiment, the pulse voltage is applied to the stator 10 under the above conditions and superimposed on the drive voltage. Therefore, the rotational speed of the superconducting rotor 20 reaches the speed of the rotating magnetic field of the stator 10 before the predetermined time (W) elapses. This causes the superconducting squirrel-cage winding 22 to shift from the magnetic flux flow state to the magnetic flux trapping state so that the superconducting rotor 20 is in the synchronous rotation mode before the predetermined time (W) elapses.

When the predetermined time (W) elapses (YES at step S102), the control circuit 50 operates the switches so that SW1 to SW3 are turned off and SW4 to SW6 are turned on (step S103). After that, the control circuit 50 applies the control pattern for synchronous rotation to the superconducting rotating machine 100 that is rotated mainly by the synchronous torque, and shifts to drive voltage control that adjusts the amplitude and frequency of the three-phase AC voltage applied to the stator windings 16 via the drive circuit 70.

Figure 9:
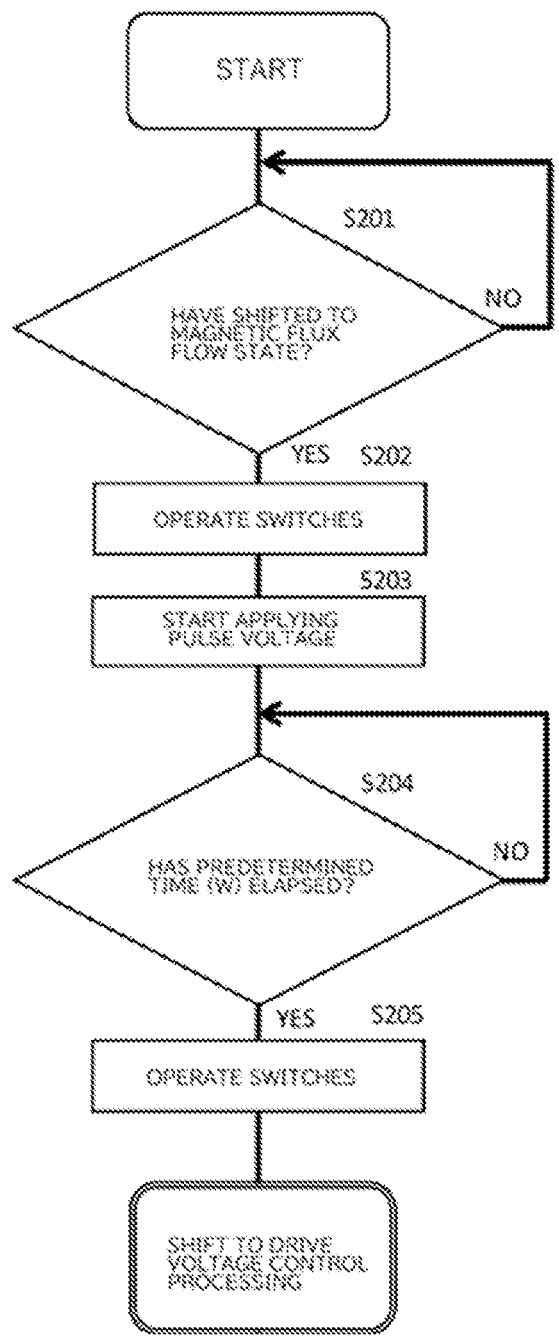
FIG. 9 is a flowchart for explaining another aspect of the method of driving the superconducting rotating machine 100.

The following describes a method of driving the superconducting rotating machine in the synchronous rotation mode when a pulse voltage set the superconducting squirrel-cage winding to a magnetic flux flow state for replenishing the magnetic flux, with reference to FIG. 9. FIG. 9 is a flowchart for explaining another aspect of the method of driving the superconducting rotating machine. However, the present invention is not limited to this aspect.

The amount of magnetic flux trapped by the rotor in the synchronous rotation mode has a suitable amount depending on its rotational speed. Therefore, in the synchronous rotation mode, the amount of magnetic flux initially trapped may be insufficient or may be too large depending on the rotational speed, resulting in cases in which it is desired to change the trapped magnetic flux amount to efficiently maintain the synchronous rotation mode. However, when the magnetic flux amount is changed that is short in the synchronous rotation mode, it is necessary to once release the superconducting squirrel-cage winding 22 from the magnetic flux trapping state and shift it to the magnetic flux flow state to replenish the magnetic flux.

The control circuit 50 monitors the amount of magnetic flux trapped by the superconducting rotor 20 in the synchronous rotation mode. The control circuit 50 then continues monitoring until it becomes necessary to shift the superconducting squirrel-cage winding 22 to the magnetic flux flow state to adjust the amount of magnetic flux trapped in relation to the rotational speed (NO at step S201). Next, when the control circuit 50 determines that the superconducting squirrel-cage winding 22 needs to be shifted to the magnetic flux flow state (YES at step S201), the control circuit 50 turns on SW1 to SW3 (step S202) and starts applying a pulse voltage from the pulse applying circuit 60 to the superconducting rotating machine 100 (step S203). The timing at which the control circuit 50 determines that the superconducting squirrel-cage winding 22 needs to be shifted to the magnetic flux flow state is not particularly limited. However, it is preferable to set a predetermined timing depending on the increase or decrease of the rotational speed based on the trapped magnetic flux amount. In the present embodiment, the superconducting rotating machine 100 is configured such that it can supply the pulse voltage while the switches SW4 to SW6 are turned on at the time of the pulse voltage supply. However, the superconducting rotating machine 100 may be configured to supply the pulse voltage after the switches SW4 to SW6 are turned off.

In the present embodiment, in order to retrap the magnetic flux that can efficiently continue the synchronous rotation mode depending on the rotational speed, the control circuit 50 adjusts the amplitude and frequency of the AC voltage of the pulse applying circuit 60, to apply a rectangular pulse voltage (Vp) to the stator windings 16 so that the voltage when the pulse voltage is superimposed on the drive voltage is higher than Vw and less than Vmax. The control circuit 50 applies the pulse voltage from the pulse applying circuit 60 to the superconducting rotating machine 100 until the predetermined time (W) elapses (NO at step S204). As mentioned above, the predetermined time (W) can be determined based on the relationship between the electrical time constant ($\tau_e$) of the superconducting rotating machine 100 and the mechanical time constant ($\tau_m$) of the superconducting rotating machine so that $\tau_e < T < \tau_m$.

In the present embodiment, since the pulse voltage is applied to the stator 10 under the above conditions, the current value (Io) of the shielding current of the superconducting squirrel-cage winding 22 becomes higher than the critical current value (Ic) thereof. This allows the superconducting squirrel-cage winding 22 to shift from the magnetic shielding state to the magnetic flux flow state and thereby retrap the magnetic flux of the rotating magnetic field. At this time, according to the present embodiment, application of the pulse voltage (Vp) generates a sufficient amount of magnetic flux in the rotating magnetic field. This can increase the amount of magnetic flux that links with the superconducting squirrel-cage winding 22 when the winding 22 shifts to the magnetic flux flow state.

When the predetermined time (W) elapses (YES at step S204), the control circuit 50 operates the switches so that SW1 to SW3 are turned off and SW4 to SW6 are turned on (step S205). At this time, the shift to the magnetic flux flow state causes the superconducting rotating machine 100 to shift from the synchronous rotation mode to the slip rotation mode. Here, the rotational speed of the superconducting rotor 20 is less reduced in the shift, so that the superconducting rotating machine 100 quickly returns to the synchronous rotation mode after the magnetic flux is trapped.

After that, the control circuit 50 applies the control pattern for synchronous rotation to the superconducting rotating machine 100 that rotates mainly by the synchronous torque, and shifts to drive voltage control that adjusts the amplitude and frequency of the AC voltage applied to the stator windings 16 via the drive circuit 70.

Effect

When the superconducting squirrel-cage winding 22 is in a magnetic shielding state at a time of starting or the like, the superconducting rotating machine 100 configured as described above outputs a pulse voltage and superimposes it on the drive voltage to allow the winding 22 to quickly shift to a magnetic flux flow state. As a result, the superconducting rotating machine 100 quickly shifts to a slip rotation mode and then to a synchronous rotation mode after starting. This allows the superconducting rotating machine 100 to significantly reduce the time required to shift to the synchronous rotation mode as compared with the case in which the pulse voltage is not used. In addition, the application of the drive voltage (Vb) requires an application time of the electrical time constant. Therefore, the superconducting rotating machine 100 can prevent returning to the original magnetic shielding state immediately after shifting to the magnetic flux flow state by superimposing the pulse voltage (Vp) on the drive voltage (Vb).

Further, the superconducting rotating machine 100 uses the pulse voltage to make it possible to simplify the voltage start-up control and to reduce the steady-state current capacity of the power source to a value suitable for the output at the time of rotation. This can greatly simplify the application of the starting current as compared with the conventional one and thereby drastically reduce loss to be generated. In other words, the superconducting rotating machine 100, which can be started by applying a pulse voltage for a short period of time, can minimize the accompanying loss of the power source and the superconducting rotating machine 100. This makes it possible to design the semiconductor switching elements of the power source and the windings of the superconducting rotating machine 100 to prevent heat generation, and further makes it possible to reduce the size and weight of the superconducting rotating machine 100 and reduce the manufacturing cost. Further, the superconducting rotating machine 100 can greatly simplify the application of the starting current compared to the conventional one. This makes it possible to prevent release from a synchronous rotation mode after a shift to the synchronous rotation mode.

Further, when the superconducting rotating machine 100 is driven in the synchronous rotation mode, it can output a pulse voltage to shift the superconducting squirrel-cage winding 22 from a magnetic flux trapping state to a magnetic flux flow state. As a result, for example, when the superconducting rotating machine of the present embodiment is driven in the synchronous rotation mode and the trapped amount of magnetic flux is insufficient or excessive, the superconducting squirrel-cage winding 22 can be shift to the magnetic flux flow state by the pulse voltage to retrap the magnetic flux of the rotating magnetic field. At this time, the shift to the magnetic flux flow state causes the superconducting rotating machine 100 to shift from the synchronous rotation mode to the slip rotation mode. However, since the superconducting rotating machine 100 can be returned to the synchronous rotation mode immediately after the magnetic flux is trapped, the substantial duration of the synchronous rotation mode can be significantly extended. In addition, the quick return from the slip rotation mode to the synchronous rotation mode makes it possible to effectively prevent reduction in torque in the shift from the synchronous rotation mode to the slip rotation mode.

For example, under the following conditions, it was confirmed that the superconducting rotating machine was able to be changed to a synchronous rotation mode by a rectangular pulse voltage.

(Conditions)
Outer diameter of rotor: 174.8 mm (iron core: electromagnetic steel plate, winding: superconducting wire (bismuth-based high-temperature superconducting wire rod))
Inner diameter of stator: 176.0 mm (iron core: electromagnetic steel plate, winding: superconducting wire (bismuth-based high-temperature superconducting wire rod))
Shaft length: 102.0 mm
Number of turns per phase per pole: 12
Number of poles: 4
Gap length: 0.6 mm
Voltage (Vp+b) obtained by superimposing pulse voltage (Vp) on drive voltage (Vb): rectangular wave, 92 V to 132 V (effective value)
Drive voltage (Vb): 80 V (effective value)
Frequency: 60 Hz
application time (T)=$10^{-4}$ seconds ($T_{on}$)+W (0.3 to 1 seconds)+$T_{off}$ ($10^{-4}$ seconds)
Vmin: 80 V (phase voltage)
Vw: 98 V
Vmax: 130 V
Electrical time constant ($\tau_e$): 0.5 s
Mechanical time constant ($\tau_m$): 2 s

[Modifications]

Although the present embodiment has been specifically described above, the present embodiment can be modified and implemented as follows.

(First Modification)

For example, the above example is described with the aspect such that: the waveform of the pulse voltage applied to the stator 10 is rectangular; and the pulse voltage output unit and the drive voltage output unit are provided in different voltage output circuits. However, the present invention is not limited to this aspect. For example, the superconducting rotating machine may have an aspect such that the pulse voltage output unit and the drive voltage output unit are provided in the same voltage output circuit.

Figure 10:
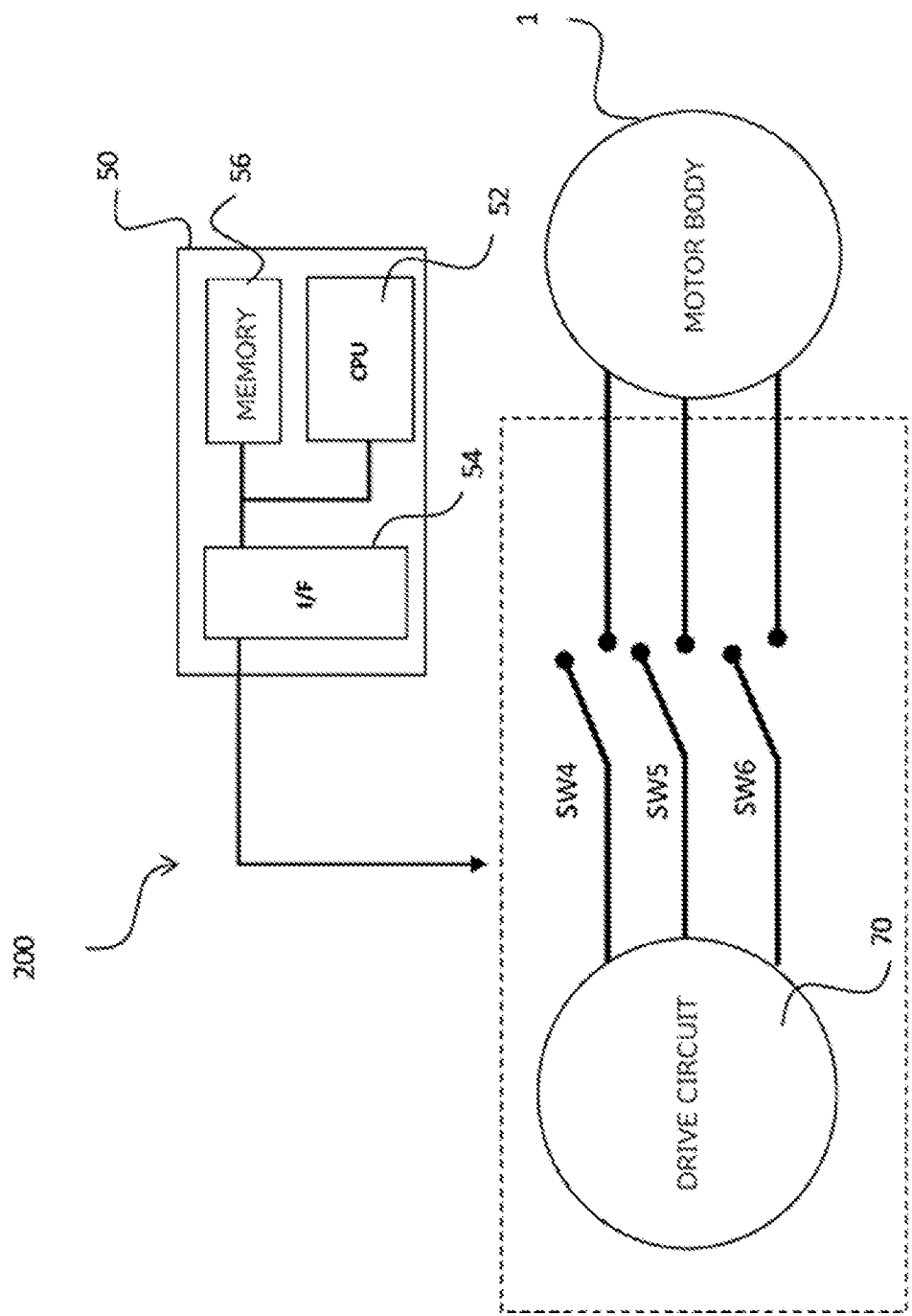
FIG. 10 is a block diagram showing one aspect of a configuration of the superconducting rotating machine of a first modification.

A first modification will be described with reference to figures. FIG. 10 is a block diagram showing one aspect of the configuration of the superconducting rotating machine of the first modification.

As shown in FIG. 10, a superconducting rotating machine 200 includes a motor body 1 (three-phase HTS-ISM motor), a control circuit 50, and a drive circuit 70. In the present modification, the pulse output unit and the drive voltage output unit are configured as a single circuit, and the pulse voltage is output from the drive circuit 70.

(Pulse Voltage)

Figure 11:
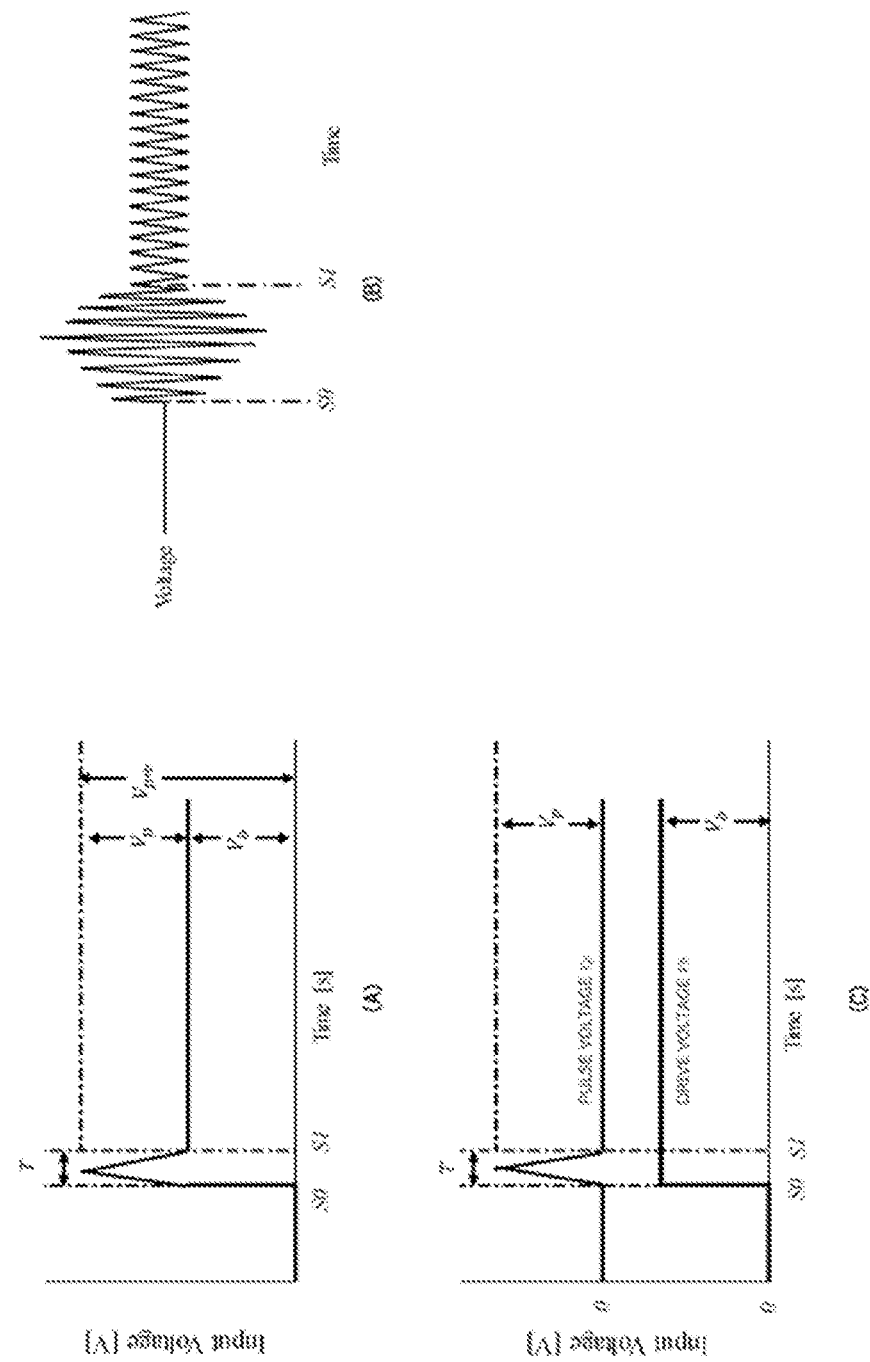
FIG. 11 is a graph showing a relationship between a waveform of a pulse voltage, a pulse voltage (Vp), and a drive voltage (Vb) in the first modification.

In the present embodiment, a pulse voltage of a triangular wave ((ramp wave (ramp pulse)), which is higher than the drive voltage output from the drive circuit 70, is applied to the stator windings from the drive circuit 70 to superimpose the pulse voltage on the drive voltage. FIG. 11 is a graph showing a relationship between a pulse voltage waveform, a pulse voltage (Vp), and a drive voltage (Vb) in the first modification. In FIG. 11, the vertical axis of FIG. 11(A) indicates an input voltage (ramp wave) to the stator windings and the horizontal axis indicates the time. FIG. 11(B) shows a relationship between the variation of the input voltage supplied to the stator windings and the time with an enlarged time axis. FIG. 11(C) is a schematic diagram showing the application timing of the pulse voltage (Vp) and the drive voltage (Vb).

As shown in FIGS. 11(A) to 11(C), in the present embodiment, the control circuit 50 controls the drive circuit 70 to apply the drive voltage (Vb) to the stator windings at the timing of time S1. In addition, the control circuit 50 controls the drive circuit 70 to apply a triangular ramp wave to the stator windings to superimpose the pulse voltage (Va) on the drive voltage (Vb) during time S0 to time S1.

Also in the present modification, the pulse voltage (Vp), the drive voltage (Vb), and the application time (T) of the pulse voltage are controlled to conditions similar to the above-described first embodiment. Note that, since the pulse voltage is applied as a ramp wave in the present modification, the voltage (Vp+b) obtained by superimposing the pulse voltage (Vp) on the drive voltage Vb is based on the effective value (Vpr). The effective value (Vpr) can be calculated from Vpr=Vp+b×(1/√3). Therefore, in the present modification, the above-described pulse voltage (Vp), drive voltage (Vb), Vmin, Vw, and Vmax are compared based on Vpr calculated from Vp+b.

[Method of Driving Superconducting Rotating Machine]

Figure 12:
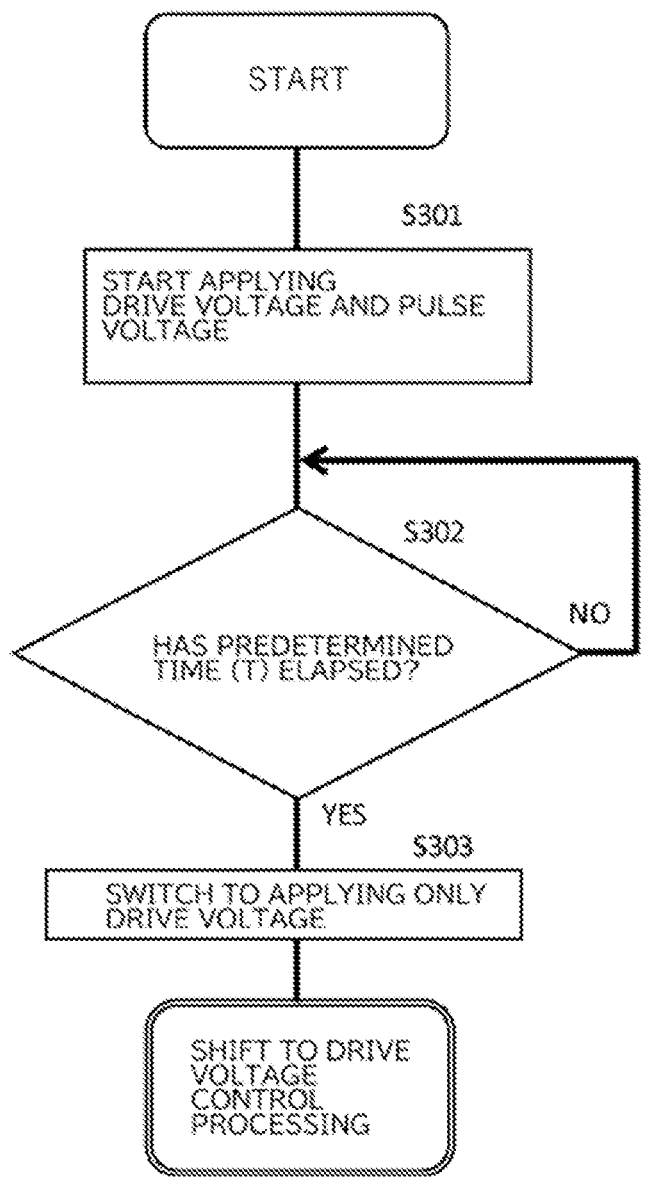
FIG. 12 is a flowchart for explaining a method of starting a superconducting rotating machine 200.

The following describes a method of driving a superconducting rotating machine by setting the superconducting squirrel-cage winding to a magnetic flux flow state by a pulse voltage according to the present modification, with reference to FIG. 12. FIG. 12 is a flowchart for explaining a method of starting the superconducting rotating machine 200. However, the present invention is not limited to this aspect.

First, the superconducting rotating machine 200 has the stator windings 16 and the superconducting squirrel-cage winding 22 that are cooled by a cooling device before starting and are in a superconducting state.

When the superconducting rotating machine 200 is started, the control circuit 50 turns on the switches SW4 to SW6 to start applying the pulse voltage and the drive voltage from the drive circuit 70 to the superconducting rotating machine 200 to shift the superconducting squirrel-cage winding 22 to the magnetic flux flow state (Step S301). Also in the present modification, in order to trap the magnetic flux necessary to start the motor in appropriate driving conditions (rotational speed and torque), the control circuit 50 adjusts the amplitude and frequency of the AC voltage of the pulse applying circuit 60 and thereby applies a pulse voltage (Vpr) of a ramp wave to the stator winding 16. The ramp wave has a voltage higher than the drive voltage at the time of steady-state driving when the pulse voltage is superimposed on the drive voltage. The ramp wave also has a voltage higher than the above-described Vmin and Vw and lower than the above-described Vmax when the pulse voltage is superimposed on the drive voltage. As a result, the current value (Io) of the shielding current of the superconducting squirrel-cage winding 22 becomes higher than the critical current value (Ic), so that the superconducting squirrel-cage winding 22 is shifted from the magnetic shielding state to the magnetic flux flow state to cause superconducting rotor 20 to start rotating in the slip rotation mode.

The control circuit 50 applies the pulse voltage from the drive circuit 70 to the superconducting rotating machine 200 until the predetermined time (T) elapses (NO at step S302). As described above, the application time (T) is $t_{on}+W+t_{off}$. Since the ramp wave is affected by $t_{on}$ and $t_{off}$ more greatly than the rectangular wave, the application time (T) is used instead of W as a reference in the present modification. The predetermined time (T) can be determined based on the relationship between the electrical time constant ($\tau_e$) of the superconducting rotating machine 200 and the mechanical time constant ($\tau_m$) of the superconducting rotating machine 200 so that $\tau_e < T < \tau_m$.

When the predetermined time (T) elapses (YES at step S302), the control circuit 50 switches the voltage and frequency of the drive circuit 70 to apply the drive voltage (Vb) to the stator 10 of the motor body 1 (Step S303). After that, the control circuit 50 applies the control pattern for synchronous rotation to the superconducting rotating machine 200 that rotates mainly by the synchronous torque, and shifts to drive voltage control that adjusts the amplitude and frequency of the AC voltage applied to the stator windings 16 via the drive circuit 70.

In the first modification described above, the pulse voltage and the drive voltage can be output from a single drive circuit. The first modification makes it possible to eliminate requirement for any additional structure to the conventional high-temperature-superconducting induction-synchronous motor resulting in a simplified device, and makes it possible to inject a pulse voltage into the stator windings to provide effects similar to the first embodiment.

Also in the present modification, as in the first embodiment, when the synchronous rotation mode is working, output of a pulse voltage causes the superconducting squirrel-cage winding 22 to shift from the magnetic flux trapping state to the magnetic flux flow state.

For example, under the following conditions, it was confirmed that the superconducting rotating machine can be changed to a synchronous rotation mode by the pulse voltage of the ramp wave.
(Conditions)
  Outer diameter of rotor: 174.8 mm (iron core: electromagnetic steel plate, winding: superconducting wire (bismuth-based high-temperature superconducting wire rod))
  Inner diameter of stator: 176.0 mm (iron core: electromagnetic steel plate, winding: superconducting wire (bismuth-based high-temperature superconducting wire rod))
  Shaft length: 102.0 mm
  Number of turns per phase per pole: 12
  Number of poles: 4
  Gap length: 0.6 mm
  Voltage (Vp+b) obtained by superimposing pulse voltage (Vp) on drive voltage (Vb): ramp wave, 112 V to 200 V (effective value)
  Drive voltage (Vb): 80 V (effective value)
  Frequency: 60 Hz
  Application time (T)=10-4 seconds ($T_{on}$)+W (0.3 to 1 seconds)+$T_{off}$ (10-4 seconds)
  Vmin: 80 V
  Vw: 98 V
  Vmax: 130 V
  Electrical time constant ($\tau_e$): 0.5 s
  Mechanical time constant ($\tau_m$): 2 s Second Embodiment For example, in the first embodiment described above, application of a pulse voltage to the stator windings and superimposing it on the drive voltage increases the shielding current flowing through the superconducting squirrel-cage winding, and this makes the relationship between the current value (Io) and the critical current value (Ic) of the superconducting squirrel-cage winding so that Io>Ic to make a shift to a magnetic flux flow state. However, the present invention is not limited to this aspect. For example, there may be an aspect such that: the superconducting rotating machine further includes a pulse magnetic field output unit that generates a pulse magnetic field by a pulse voltage output from a pulse voltage output unit; and the machine applies the pulse magnetic field output from the pulse magnetic field output unit to the superconducting rotor.

Figure 13:
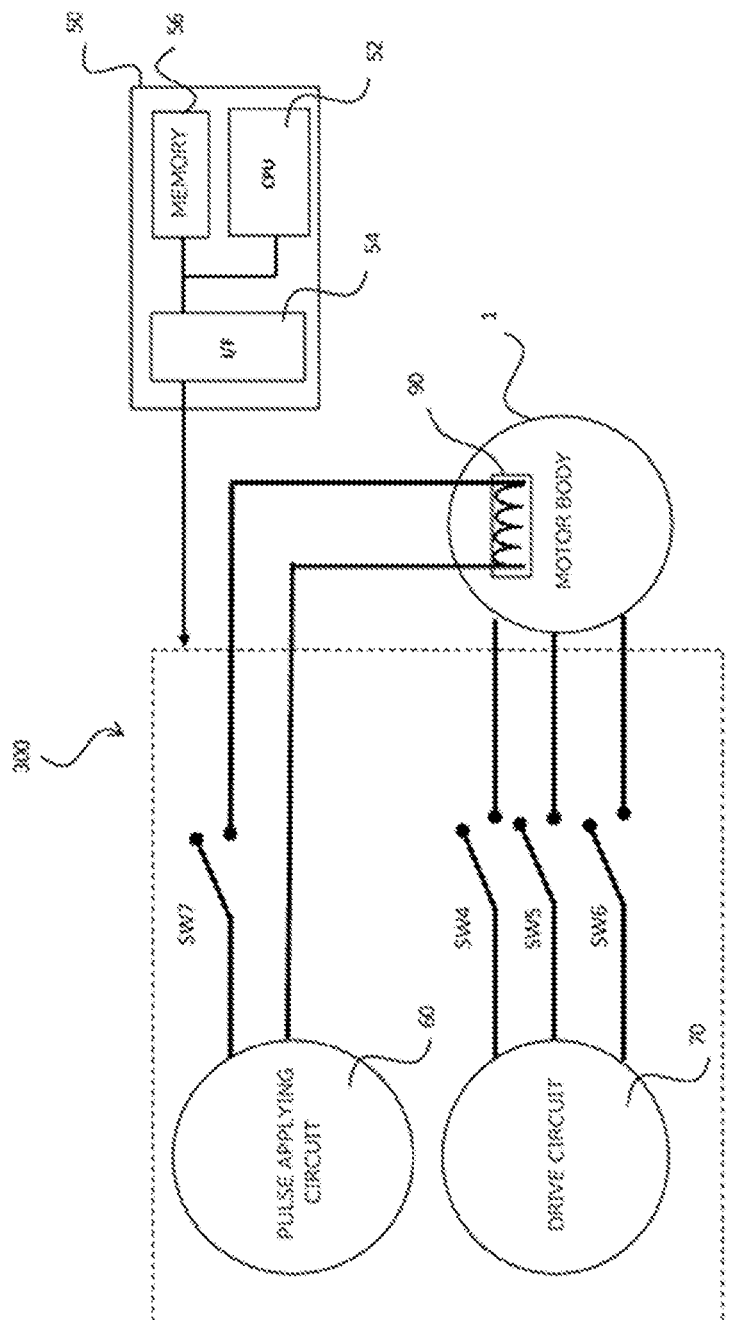
FIG. 13 is a block diagram showing one aspect of a configuration of the superconducting rotating machine of a second embodiment.

A second embodiment will be described with reference to figures. FIG. 13 is a block diagram showing one aspect of a configuration of a superconducting rotating machine of the second embodiment.

As shown in FIG. 13, a superconducting rotating machine 300 includes a motor body 1 (three-phase HTS-ISM motor), a control circuit 50, a pulse applying circuit 60, a drive circuit 70, and a magnetic field generating coil 90. In the present modification, the pulse voltage output from the pulse applying circuit 60 is applied to the magnetic field generating coil 90. When a pulse voltage is applied to the magnetic field generating coil 90, a pulse magnetic field is generated. A magnetic field generating coil 90 is installed in the superconducting rotor 20, and is provided with a pulse voltage to generate a pulse magnetic field that is applied to the superconducting rotor 20. The installation location of the magnetic field generating coil 90 is not particularly limited. For example, the magnetic field generating coil 90 may be installed in the end rings 28 of the superconducting squirrel-cage winding 22. Alternatively, the magnetic field generating coil 90 may be a squirrel-cage coil composed of a plurality of rotor bars and a pair of annular end rings that short-circuit the ends of each rotor bar. The squirrel-cage coil may be installed in the rotor iron core 24 similarly to the superconducting squirrel-cage winding 22. At this time, the rotor bars of the magnetic field generating coil 90 are preferably installed, for example, so as to be positioned radially inside the iron core relative to the rotor bars 26 of the superconducting squirrel-cage winding 22.

[Method of Driving Superconducting Rotating Machine]

Figure 14:
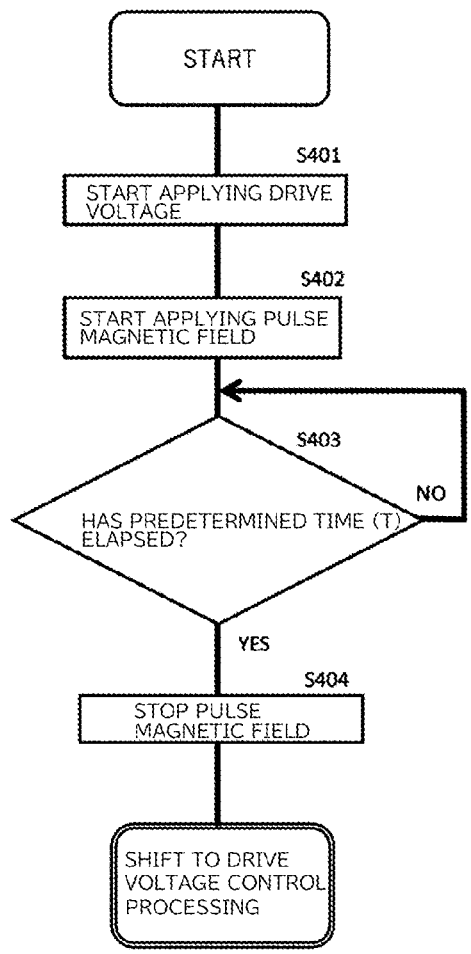
FIG. 14 is a flowchart for explaining a method of starting a superconducting rotating machine 300.

The following describes a method of driving the superconducting rotating machine with the superconducting squirrel-cage winding in a magnetic flux flow state using a pulse voltage according to the present modification, with reference to FIG. 14. FIG. 14 is a flowchart for explaining a method for starting the superconducting rotating machine 300. However, the present invention is not limited to this aspect.

First, the superconducting rotating machine 300 has the stator windings 16 and the superconducting squirrel-cage winding 22 that are cooled by a cooling device before starting and are in a superconducting state.

When the superconducting rotating machine 300 is started, the control circuit 50 turns on the switches SW4 to SW6 to start applying a drive voltage from the drive circuit 70 to the stator 10 of the motor body 1 (step S401). When a drive voltage is applied to the stator 10, a shielding current is generated in the superconducting squirrel-cage winding 22 and the superconducting squirrel-cage winding 22 is brought into a magnetic shielding state.

Next, the control circuit 50 turns on the switch SW7 and starts applying a pulse voltage from the pulse applying circuit 60 to the superconducting rotating machine 300 to shift the superconducting squirrel-cage winding 22 to a magnetic flux flow state (step S401). In the present modification, the pulse voltage is applied to the magnetic field generating coil 90 because the magnetic field generating coil 90 is connected to the pulse applying circuit 60. The pulse voltage applied to the magnetic field generating coil 90 is converted into a pulse magnetic field.

Since the magnetic field generating coil 90 is installed in the superconducting rotor 20 as described above, the pulse magnetic field generated by the magnetic field generating coil 90 is applied to the superconducting rotor 20. When a pulse magnetic field is applied to the superconducting rotor 20, an equivalent Lorentz force acting on the quantized magnetic flux lines in the superconducting material increases, so that the critical current value (Ic) of the superconducting squirrel-cage winding 22 decreases. In other words, according to the present modification, application of the pulse magnetic field decreases the critical current value (Ic) relative to the current value (Io) of the shielding current, flowing through the superconducting squirrel-cage winding 22, generated by the drive voltage. This can cause the relationship between the current value (Io) of the shielding current, flowing through the superconducting squirrel-cage winding 22, generated by the drive voltage and the critical current value (Ic) of the superconducting squirrel-cage winding to be Io>Ic quickly. The present modification thus allows the superconducting squirrel-cage winding 22 to quickly shift to the magnetic flux flow state. When the superconducting squirrel-cage winding 22 shifts to the magnetic flux flow state, the superconducting rotating machine 300 shifts to the slip rotation mode and starts rotating with the superconducting rotor.

The control circuit 50 applies the pulse voltage from the pulse applying circuit 60 to the magnetic field generating coil 90 until the predetermined time (W) elapses (NO at step S403). Then, when the predetermined time (W) elapses (YES at step S403), the control circuit 50 turns off the switch SW7 to stop applying the magnetic field pulse voltage to the magnetic field generating coil 90 (step S403). When the magnetic field pulse voltage stops being applied to the magnetic field generating coil 90, the pulse magnetic field stops being applied to the superconducting rotor 20. After that, the control circuit 50 applies the control pattern for synchronous rotation to the superconducting rotating machine 300 that rotates mainly by the synchronous torque, shifts to drive voltage control that adjusts the amplitude and frequency of the AC voltage applied to the stator windings 16 via the drive circuit 70.

In the second modification described above, a pulse voltage is converted into a pulse magnetic field and the pulse magnetic field is applied to the superconducting rotor, so that the critical current value (Ic) of the superconducting squirrel-cage winding can be reduced. This can quickly set the relationship between the current value (Io) flowing through the superconducting squirrel-cage winding and the critical current value (Ic) of the superconducting squirrel-cage winding to Io>Ic. As a result, the superconducting rotating machine 300 quickly can shift to the slip rotation mode and then to the synchronous rotation mode after starting. This allows the machine to significantly reduce the time required to shift to the synchronous rotation mode as compared with the case in which the pulse voltage is not used.

Also in the present modification, as in the first embodiment, when the synchronous rotation mode is working, output of a pulse voltage causes the superconducting squirrel-cage winding 22 to shift from the magnetic flux trapping state to the magnetic flux flow state.

(Second Modification)

For example, in the above-described first and second embodiments, the description is made with the aspects in which the superconducting rotor 20 has only the superconducting squirrel-cage winding 22 as the rotor winding. However, the present invention is not limited to these aspects. For example, there may be an aspect such that the superconducting rotating machine 100 has a superconducting rotor 20 that further includes a normal-conducting squirrel-cage winding having one or more rotor bars and end rings made of a normal-conducting material in addition to the superconducting squirrel-cage winding 22.

In the present modification, the normal-conducting squirrel-cage winding can have, for example, a configuration similar to the superconducting squirrel-cage winding 22 shown in FIG. 4. Specifically, the squirrel-cage winding is composed of a plurality of rotor bars made of a normal-conducting material and a pair of annular end rings made of a normal-conducting material for short-circuiting the ends of each rotor bar. A plurality of rotor bars made of a normal-conducting material are accommodated in the slots of the rotor iron core 24.

A plurality of rotor bars made of normal-conducting materials are made of highly conductive materials such as copper, aluminum, silver, and gold, and have rectangular cross sections (but are not limited to having rectangular cross sections). In a case in which the superconducting rotating machine 100 shown in FIGS. 2 to 4 is combined with the normal-conducting squirrel-cage winding, the number of rotor bars can be the same as the number of slots 24S in the rotor iron core 24 (i.e., the number of rotor bars for the normal-conducting squirrel-cage winding is 24). The rotor bars can be placed at predetermined intervals in the circumferential direction so as to form a cylindrical and skew-structured cage larger than the superconducting squirrel-cage winding 22. However, the present modification is not limited to this aspect.

Each rotor bar made of a normal-conducting material is formed longer than the axial length of the rotor iron core 24, and protrudes from each slot 24S when accommodated in each slot 24S. A rotor bar made of a normal-conducting material can be installed, for example, in the slot 24S of the rotor iron core 24, radially outside the rotor bar 26 made of superconducting wire rod. When a rotor bar made of a normal-conducting material is thus installed, a rotor bar 26 made of a superconducting wire rod is placed inside (center side) of the rotor iron core 24, and a rotor bar made of a normal-conducting wire rod is placed outside (peripheral side) thereof.

Similarly, end rings made of normal-conducting materials can be made of highly conductive materials such as copper, aluminum, silver, and gold. The pair of end rings made of a normal-conducting material have the ends of each rotor bar joined thereto, which rotor bar is made of a normal-conducting material and protrudes from a slot.

In the present modification, for example, when the superconducting rotor 20 is in a non-superconducting state, the superconducting rotating machine 100 can be driven mainly in induction (slip) rotation by the normal-conducting squirrel-cage winding. Therefore, for example, the superconducting rotor 20 can be driven mainly by the induction torque when it is in a non-superconducting state and then a pulse voltage can be applied when the superconducting rotor 20 is brought into a superconducting state by cooling, so that the superconducting squirrel-cage winding 22 can be brought into a magnetic flux flow state quickly even during driving. As a result, even when the superconducting rotor 20 is driven mainly by the induction torque in a non-superconducting state, the superconducting rotor 20 can be shifted to the synchronous rotation mode quickly after entering a superconducting state.

Further, the present modification can be configured such that the control circuit 50 monitors primary current signals, which are signals of the primary current flowing through the stator windings 16, from the superconducting rotating machine 100 and thereby determines whether the superconducting squirrel-cage winding 22 is in a superconducting state (whether the superconducting rotating machine 100 is driven mainly by synchronous torque). For example, when the rotor is driven mainly by synchronous torque, a control pattern for synchronous rotation can be applied to the superconducting rotating machine 100. Otherwise, it is determined that the rotor is rotated mainly by induced (slip) torque, and a control pattern for slip rotation can be applied thereto.

(Third Modification)

For example, in the first and second embodiments described above, only superconducting wire rods are used for the stator windings 16 of the stator 10, but the present invention is not limited to these aspects. For example, the stator 10 may have other windings (normal-conducting windings) made of normal-conducting wire rods in addition to the stator windings 16, or may be made of normal-conducting wire rods instead of the superconducting wire rods. In this case, for example, the superconducting rotating machine 100 can be configured to form magnetic poles in the stator 10 with normal-conducting windings so that a rotating magnetic field can be generated even in the normal-conducting state. According to this configuration, for example, the superconducting rotating machine 100 can be started and driven even before the superconducting wire rods of the stator windings 16 are brought into a superconducting state.

(Other Modifications)

For example, the superconducting wire rod described above is not limited to a bismuth-based high-temperature superconducting wire rod, and can be a metal-based low-temperature superconducting wire rod such as NbTi or $Nb_3Sn$, an yttrium-based high-temperature superconducting wire rod, or a magnesium diboride superconducting wire rod.

The first and second embodiments described above are described with the case in which wire rods are used for the superconducting material and the normal-conducting material, but the present invention is not limited to this aspect. For example, bulk materials may be used for the superconducting material and the normal-conducting material. For example, a bulk material can be used for a superconducting material and/or a normal-conducting material in accordance with applications in which it is desired to use a material with a large current capacity in the stator or rotor (for example, a large superconducting motor, etc.).

Although various embodiments of the present invention are described above, the present invention is not limited to the above-described embodiments. Further, the present invention can be modified without departing from its gist.

The disclosure of Japanese Patent Application No. 2020-195167 filed on Nov. 25, 2020 is incorporated herein by reference in its entirety.

In addition, all literatures, patent applications, and technical standards described in the specification are incorporated herein by reference to the same extent as in a case in which individual literatures, patent applications, and technical standards are specifically and individually noted to be incorporated by reference.

REFERENCE SIGNS LIST

10: stator, 12: stator iron core, 16: stator windings, 20: superconducting rotor, 22: superconducting squirrel-cage winding, 60: pulse applying circuit, 70: drive circuit, 90: magnetic field generating coil, 100, 200, 300: superconducting rotating machine

The invention claimed is:

1. A superconducting rotating machine comprising:
   a stator that has a tubular stator iron core and stator windings wound around the stator iron core and generates a rotating magnetic field;
   a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars;
   a pulse voltage output unit that outputs a pulse voltage to shift the superconducting squirrel-cage winding from at least one of a magnetic shielding state and a magnetic flux trapping state to a magnetic flux flow state; and
   a driving voltage output unit that applies a driving voltage to the stator windings to rotationally drive the superconducting rotor,
   the superconducting rotating machine being capable of shifting from a slip rotation mode to a synchronous rotation mode,
   wherein the pulse voltage output from the pulse voltage output unit is superimposed on the driving voltage, and the superconducting squirrel-cage winding is shifted from at least one of the magnetic shielding state and the magnetic flux trapping state to the magnetic flux flow state to shift to the slip rotation mode.

2. The superconducting rotating machine according to claim 1, wherein
   a voltage obtained by superimposing the pulse voltage on the driving voltage is equal to or higher than Vmin represented by the following formula, $$V_{min} = \sqrt{r_1^2 + (x_1 + x_2')^2} \times Ic'$$

where Vmin is a phase voltage, $r_1$ is stator windings resistance, $x_1$ is a leakage reactance of the stator windings, $x_2'$ is a leakage reactance of the rotor windings converted to a primary side, and Ic' is a critical current of the rotor bars converted to a primary side.

3. The superconducting rotating machine according to claim 1, wherein
   an application time (T) of the pulse voltage, an electrical time constant ($\tau_e$) of the superconducting rotating machine, and a mechanical time constant ($\tau_m$) of the superconducting rotating machine are represented by a formula: $\tau_e < T < \tau_m$.

4. The superconducting rotating machine according to claim 1, wherein the pulse voltage output unit and the driving voltage output unit are provided in an identical voltage output circuit.

5. The superconducting rotating machine according to claim 1, wherein
the pulse voltage output unit and the driving voltage output unit are provided in different voltage output circuits.

6. A superconducting rotating machine comprising:
a stator that has a tubular stator iron core and stator windings wound around the stator iron core and generates a rotating magnetic field;
a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars;
a driving voltage output unit that applies a driving voltage to the stator windings to rotationally drive the superconducting rotor,
a pulse voltage output unit that outputs a pulse voltage to shift the superconducting squirrel-cage winding from at least one of a magnetic shielding state and a magnetic flux trapping state to a magnetic flux flow state; and
a pulse magnetic field output unit that generates a pulse magnetic field by a pulse voltage output from the pulse voltage output unit,
the superconducting rotating machine being capable of shifting from a slip rotation mode to a synchronous rotation mode,
wherein a pulse magnetic field output from the pulse magnetic field output unit is applied to the superconducting rotor, and the superconducting squirrel-cage winding is shifted from at least one of the magnetic shielding state and the magnetic flux trapping state to the magnetic flux flow state to shift to the slip rotation mode.

7. The superconducting rotating machine according to claim 6, wherein
the pulse voltage output unit and the driving voltage output unit are provided in an identical voltage output circuit.

8. The superconducting rotating machine according to claim 6, wherein
the pulse voltage output unit and the driving voltage output unit are provided in different voltage output circuits.

9. A method of controlling a superconducting rotating machine,
the superconducting rotating machine including:
a stator that has a tubular stator iron core and stator windings wound around the stator iron core and generates a rotating magnetic field; and
a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars,
the superconducting rotating machine being capable of shifting from a slip rotation mode to a synchronous rotation mode,
the method comprising:
applying a driving voltage to the stator windings to rotationally drive the superconducting rotor; and
applying a pulse voltage to the superconducting rotating machine to superimpose the pulse voltage on the driving voltage in order to shift the superconducting squirrel-cage winding from at least one of a magnetic shielding state and a magnetic flux trapping state to a magnetic flux flow state, and shifting the superconducting squirrel-cage winding from at least one of the magnetic shielding state and the magnetic flux trapping state to the magnetic flux flow state to shift the superconducting squirrel-cage winding to the slip rotation mode.

10. A method of controlling a superconducting rotating machine,
the superconducting rotating machine including:
a stator that has a tubular stator iron core and stator windings wound around the stator iron core and generates a rotating magnetic field; and
a superconducting rotor having: a superconducting squirrel-cage winding that is held rotatably with the rotating magnetic field of the stator and has one or more rotor bars and end rings each made of a superconducting material; and a rotor iron core that has a plurality of slots to accommodate the rotor bars,
the superconducting rotating machine being capable of shifting from a slip rotation mode to a synchronous rotation mode,
the method comprising:
applying a driving voltage to the stator windings to rotationally drive the superconducting rotor; and
outputting a pulse voltage to shift the superconducting squirrel-cage winding from at least one of a magnetic shielding state and a magnetic flux trapping state to a magnetic flux flow state, and converting the pulse voltage into a pulse magnetic field; and
applying the pulse magnetic field to the superconducting rotor, and shifting the superconducting squirrel-cage winding from at least one of the magnetic shielding state and the magnetic flux trapping state to the magnetic flux flow state to shift the superconducting squirrel-cage winding to the slip rotation mode.

* * * * *